US011838100B2

(12) United States Patent
Tseng et al.

(10) Patent No.: US 11,838,100 B2
(45) Date of Patent: Dec. 5, 2023

(54) DYNAMIC SEARCH SPACE (DE)ACTIVATION IN WIRELESS COMMUNICATION SYSTEMS

(71) Applicant: FG Innovation Company Limited, Tuen Mun (CN)

(72) Inventors: Yung-Lan Tseng, Hsinchu (TW); Hung-Chen Chen, Hsinchu (TW); Chie-Ming Chou, Hsinchu (TW)

(73) Assignee: FG Innovation Company Limited, Tuen Mun (HK)

(*) Notice: Subject to any disclaimer, the term of this patent is extended or adjusted under 35 U.S.C. 154(b) by 0 days.

(21) Appl. No.: 16/369,749

(22) Filed: Mar. 29, 2019

(65) Prior Publication Data

US 2019/0305867 A1    Oct. 3, 2019

Related U.S. Application Data

(60) Provisional application No. 62/650,729, filed on Mar. 30, 2018.

(51) Int. Cl.
*H04J 11/00* (2006.01)
*H04W 24/10* (2009.01)
*H04W 72/23* (2023.01)

(52) U.S. Cl.
CPC ....... *H04J 11/0086* (2013.01); *H04J 11/0079* (2013.01); *H04W 24/10* (2013.01); *H04W 72/23* (2023.01)

(58) Field of Classification Search
CPC .. H04J 11/0079; H04J 11/0086; H04W 24/10; H04W 72/042

USPC ......................................................... 370/329
See application file for complete search history.

(56) References Cited

U.S. PATENT DOCUMENTS

| | | | |
|---|---|---|---|
| 2011/0205978 A1* | 8/2011 | Nory | H04L 5/0007 370/329 |
| 2017/0048828 A1 | 2/2017 | Um et al. | |
| 2018/0183551 A1* | 6/2018 | Chou | H04W 74/006 |
| 2018/0279358 A1* | 9/2018 | Babaei | H04W 72/14 |

(Continued)

OTHER PUBLICATIONS

NTT Docomo, Inc., "Remaing issues on bandwidth parts for NR", R1-1720825, 3GPP TSG RAN WG1 Meeting 91, Reno, USA, Nov. 27-Dec. 1, 2017.

(Continued)

*Primary Examiner* — Huy D Vu
*Assistant Examiner* — Nizam U Ahmed
(74) *Attorney, Agent, or Firm* — ScienBiziP, P.C.

(57) ABSTRACT

Some of the present embodiments provide a method for search space monitoring by a user equipment (UE). The method includes monitoring a first search space and a second search space. The method may receive, from a serving base station, a search space monitoring (de)activation message, which is transmitted by the serving base station of the UE, by monitoring the first search space. The method deactivates the monitoring of the second search space based on the received search space (de)activation message. In some of the present embodiments, each of the first and second search spaces includes one or more physical downlink control channel (PDCCH) candidates, and monitoring the first search space and the second search space comprises decoding the one or more PDCCH candidates in each of the first search space and the second search space.

4 Claims, 11 Drawing Sheets

(56) References Cited

U.S. PATENT DOCUMENTS

| | | | |
|---|---|---|---|
| 2019/0132824 A1* | 5/2019 | Jeon | H04L 5/00 |
| 2019/0132862 A1* | 5/2019 | Jeon | H04L 5/0064 |
| 2019/0141742 A1* | 5/2019 | Zhou | H04L 5/0064 |
| 2019/0215136 A1* | 7/2019 | Zhou | H04B 17/24 |
| 2019/0246442 A1* | 8/2019 | Park | H04L 5/0055 |
| 2019/0261425 A1* | 8/2019 | Park | H04L 1/0026 |
| 2020/0374890 A1* | 11/2020 | Wu | H04J 11/0023 |
| 2021/0167930 A1* | 6/2021 | Jeon | H04L 27/2607 |

OTHER PUBLICATIONS

NTT Docomo, Inc., "Search space", R1-1802480, 3GPP TSG RAN WG1 Meeting #92, Athens, Greece, Feb. 26-Mar. 2, 2018.
Qualcomm Incorporated 3GPP Tsg-Ran WG1 NR AdHoc R1-1700816 Common control resource set and UE-specific control resource set Jan. 20, 2017 (Jan. 20, 2017) chapter 2.
Samsung 3GPP TSG RAN WG1 Meeting #95 R1-1813011 UE adaptation schemes Nov. 16, 2018 (Nov. 16, 2018) chapter 2.
Qualcomm Incorporated 3GPP TSG-RAN WG1 NR AdHoc R1-1700817 UE power saving for PDCCH monitoring Jan. 20, 2017 (Jan. 20, 2017) chapter 2.

* cited by examiner

DYNAMIC SEARCH SPACE (DE)ACTIVATION IN WIRELESS COMMUNICATION SYSTEMS

CROSS-REFERENCE TO RELATED APPLICATION(S)

The present application claims the benefit of and priority to a provisional U.S. Patent Application Ser. No. 62/650,729 filed on Mar. 30, 2018, entitled "Dynamic Search Space (De)Activation Methods,".

FIELD

The present disclosure generally relates to wireless communications, and more particularly, to dynamic activation and/or deactivation of search spaces in the next generation networks.

BACKGROUND

In order to provide a User Equipment (UE) with control information, the base station (e.g., a Next Generation Node B (or gNB) in the 5G communication network) configures one or more search spaces to the UE (e.g., through Radio Resource Control (RRC)) signaling. A search space defines when, where, and how the UE may find the Physical Downlink Control Channel (PDCCH) candidates (e.g., which include the control information). Each search space contains a group of PDCCH candidates with each PDCCH candidate having at least one Downlink Control Information (DCI) for at least one UE. However, the UE does not exactly know which PDCCH candidate contains the DCI for the UE itself. Instead, the UE has to decode every PDCCH candidate to find the DCI that is for the UE. This type of the PDCCH decoding (also called blind decoding) is not very efficient and consumes a lot of power in the UE. There is a need in the art to make the process of bling decoding more efficient and reduce the power consumption in the UE.

SUMMARY

The present disclosure is directed to dynamic activation and/or deactivation of search spaces in the next generation networks.

In a first aspect of the present application, a method for search space monitoring by a user equipment (UE) is provided. The method comprises monitoring a first search space and a second search space; receiving, from a serving base station, a search space monitoring (de)activation message, by monitoring the first search space; and deactivating the monitoring of the second search space based on the search space (de)activation message, wherein each of the first and second search spaces includes one or more physical downlink control channel (PDCCH) candidates, and monitoring the first search space and the second search space comprises decoding the one or more PDCCH candidates in each of the first search space and the second search space.

In an implementation of the first aspect, the UE deactivates the monitoring of the second search space after a time period after receiving the search space monitoring (de) activation message, wherein the time period is pre-defined or specified by control signaling transmitted by the serving base station.

In another implementation of the first aspect, the first search space and the second search space are configured in a same or different bandwidth parts (BWPs).

In yet another implementation of the first aspect, the first search space and the second search space are configured in a same or different cells.

In yet another implementation of the first aspect, the different cells belong to different cell groups.

In yet another implementation of the first aspect, the search space monitoring (de)activation message comprises a downlink control information (DCI) signaling transmitted on the first search space.

In yet another implementation of the first aspect, the search space monitoring (de)activation message comprises a medium access control (MAC) control element (CE) signaling derived from decoding the PDCCH candidates on the first search space.

In yet another implementation of the first aspect, the search space monitoring (de)activation message is a $1^{st}$ search space monitoring (de)activation message, the method further comprising: receiving, from the serving base station, a $2^{nd}$ search space monitoring (de)activation message by monitoring the first search space; and activating monitoring of a third search space based on the $2^{nd}$ search space (de)activation message.

In yet another implementation of the first aspect, the $2^{nd}$ search space monitoring (de)activation message comprises one of a downlink control information (DCI) signaling transmitted on the first search space and a medium access control (MAC) control element (CE) signaling derived from decoding the PDCCH candidates on the first search space.

In yet another implementation of the first aspect, the UE activates the monitoring of the third search space after a time period after receiving the $2^{nd}$ search space monitoring (de) activation message, wherein the time period is one of predefined and specified by control signaling transmitted by the serving base station.

In a second aspect of the present application, a method for a base station for (de)activating search space monitoring is provided. The method comprises transmitting, to a user equipment (UE) that monitors a first search space and a second search space by decoding one or more physical downlink control channel (PDCCH) candidates included in each of the first and second search spaces, a search space monitoring (de)activation message in the first search space, wherein the UE deactivates the monitoring of the second search space after receiving the search space (de)activation message.

In an implementation of the second aspect, the UE deactivates the monitoring of the second search space after a time period after receiving the search space monitoring (de) activation message, wherein the time period is pre-defined or specified by control signaling transmitted by the serving base station.

In another implementation of the second aspect, the first search space and the second search space are configured in a same or different bandwidth parts (BWPs).

In yet another implementation of the second aspect, the first search space and the second search space are configured in a same or different cells.

In yet another implementation of the second aspect, the different cells belong to different cell groups.

In yet another implementation of the second aspect, transmitting the search space monitoring (de)activation message comprises transmitting, on the first search space, the search space monitoring (de)activation message using a downlink control information (DCI) signaling.

In yet another implementation of the second aspect, transmitting the search space monitoring (de)activation message comprises transmitting, on the first search space, the search space monitoring (de)activation message using a medium access control (MAC) control element (CE) signaling.

In yet another implementation of the second aspect, the search space monitoring (de)activation message is a $1^{st}$ search space monitoring (de)activation message, the method further comprising: transmitting, to the UE, a $2^{nd}$ search space monitoring (de)activation message in the first search space, wherein the UE activates monitoring of a third search space after receiving the $2^{nd}$ search space (de)activation message.

In yet another implementation of the second aspect, transmitting the $2^{nd}$ search space monitoring (de)activation message comprises one of transmitting, on the first search space, the $2^{nd}$ search space monitoring (de)activation message using a downlink control information (DCI) signaling, and transmitting, on the first search space, the $2^{nd}$ search space monitoring (de)activation message using a medium access control (MAC) control element (CE) signaling.

In yet another implementation of the second aspect, the UE activates the monitoring of the third search space after a time period after receiving the $2^{nd}$ search space monitoring (de)activation message, wherein the time period is one of predefined and specified by control signaling transmitted by the base station.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

DETAILED DESCRIPTION

Figure 1:
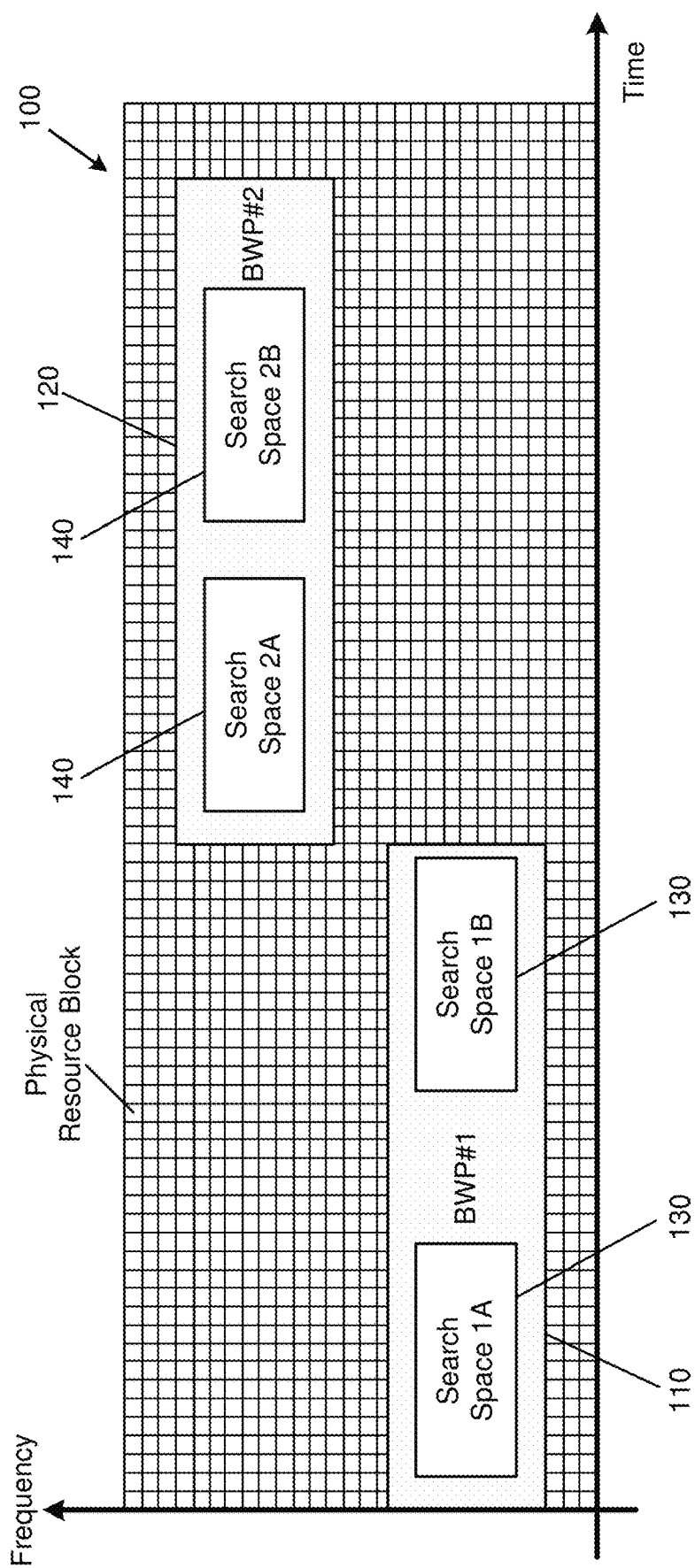
FIG. 1 illustrates a component carrier (cell) configured with multiple bandwidth parts (BWPs) on a time-frequency grid, according to an example implementation of the present application.

The following description contains specific information pertaining to exemplary embodiments in the present disclosure. The drawings in the present disclosure and their accompanying detailed description are directed to merely exemplary embodiments. However, the present disclosure is not limited to merely these exemplary embodiments. Other variations and embodiments of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the example figures. However, the features in different implementations may be differed in other respects, and thus shall not be narrowly confined to what is shown in the figures.

References to "one implementation," "an implementation," "example implementation," "various implementations," "some implementations," "implementations of the present application," etc., may indicate that the implementation(s) of the present application so described may include a particular feature, structure, or characteristic, but not every possible implementation of the present application necessarily includes the particular feature, structure, or characteristic. Further, repeated use of the phrase "in one implementation," or "in an example implementation," "an implementation," do not necessarily refer to the same implementation, although they may. Moreover, any use of phrases like "implementations" in connection with "the present application" are never meant to characterize that all implementations of the present application must include the particular feature, structure, or characteristic, and should instead be understood to mean "at least some implementations of the present application" includes the stated particular feature, structure, or characteristic. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

The term "and/or" herein is only an association relationship for describing associated objects, and represents that three relationships may exist, for example, A and/or B may represent that: A exists alone, A and B exist at the same time, and B exists alone. In addition, the character "/" used herein generally represents that the former and latter associated objects are in an "or" relationship.

Furthermore, combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims.

Persons skilled in the art will immediately recognize that any network function(s) or algorithm(s) described in the present disclosure may be implemented by hardware, software or a combination of software and hardware. Described functions may correspond to modules that may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of Applications Specific Integrated Circuitry (ASIC), programmable logic arrays, and/or using one or more digital signal processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

A radio communication network architecture (e.g., a long term evolution (LTE) system, an LTE-Advanced (LTE-A) system, or an LTE-Advanced Pro system) typically includes at least one base station, at least one UE, and one or more optional network elements that provide connection towards a network. The UE communicates with the network (e.g., a CN, an evolved packet core (EPC) network, an Evolved Universal Terrestrial Radio Access network (E-UTRAN), a Next-Generation Core (NGC), or an internet), through a radio access network (RAN) established by the base station.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE is configured to receive and transmit signals over an air interface to one or more cells in a radio access network.

A base station may include, but is not limited to, a node B (NB) as in the Universal Mobile Telecommunication System (UMTS), an evolved node B (eNB) as in the LTE-A, a Radio Network Controller (RNC) as in the UMTS, a Base Station Controller (BSC) as in the Global System for Mobile communications (GSM)/GSM EDGE Radio Access Network (GERAN), an ng-eNB as in an E-UTRA base station in connection with the 5GC, a next generation node B (gNB) as in the 5G Access Network (5G-AN), and any other apparatus capable of controlling radio communication and managing radio resources within a cell. The base station may connect to serve the one or more UEs through a radio interface to the network.

A base station may be configured to provide communication services according to at least one of the following Radio Access Technologies (RATs): Worldwide Interoperability for Microwave Access (WiMAX), GSM (often referred to as 2G), GERAN, General Packet Radio Service (GRPS), UMTS (often referred to as 3G) based on basic Wideband-Code Division Multiple Access (W-CDMA), High-Speed Packet Access (HSPA), LTE, LTE-A, eLTE, NR (often referred to as 5G), and LTE-A Pro. However, the scope of the present application should not be limited to the above mentioned protocols.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage, (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate sidelink (SL) resources for supporting proximity service (ProSe). Each cell may have overlapped coverage areas with other cells. In MR-DC (Multi-RAT Dual Connectivity) cases, the primary cell of an MCG or a primary secondary cell of an SCG may be called a special cell (SpCell). So, a PCell may refer to the SpCell of an MCG, while a PSCell may refer to the SpCell of an SCG. An MCG may include a group of serving cells associated with the MN, comprising of the SpCell and optionally one or more secondary cells (SCells). An SCG may include a group of serving cells associated with the SN, comprising of the SpCell and optionally one or more SCells.

As discussed above, the frame structure for NR is to support flexible configurations for accommodating various next generation (e.g., 5G) communication requirements, such as enhanced mobile broadband (eMBB), massive machine type communication (mMTC), ultra-reliable communication and low latency communication (URLLC), while fulfilling high reliability, high data rate and low latency requirements. The orthogonal frequency-division multiplexing (OFDM) technology as agreed in the 3rd Generation Partnership Project (3GPP) may serve as a baseline for NR waveform. The scalable OFDM numerology, such as the adaptive subcarrier spacing, the channel bandwidth, and the Cyclic Prefix (CP), may also be used. Additionally, two coding schemes are considered for NR: (1) low-density parity-check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resource may also be provided in an NR frame to support ProSe services.

As described above, a base station (e.g., a gNB) may configure (e.g., through RRC signaling) one or more search spaces to a UE. The UE monitors the configured search spaces in order to receive (and decode) the Physical Downlink Control Channel (PDCCH) candidates included in the search space(s). By monitoring the PDCCH candidates, the UE may obtain control information, such as Downlink Control Information (DCI), from the PDCCH candidates. A UE has to decode each PDCCH candidate within each search space occasion to obtain the DCI (i.e., the blind decoding process). In the current New Radio (NR) specification, a component carrier may include as many as four Bandwidth Parts (BWPs) and for each BWP, as many as ten search spaces (having different search space identifications (IDs)) may be configured to a UE.

The base station, in some embodiments, may configure the UE with the search space information through RRC signaling. In some other embodiments, the UE may obtain the search space configuration implicitly. That is, the UE may decode the Synchronization Signal Blocks (SSBs), and the Physical Broadcast Channel (PBCH) in the SSBs, in order to obtain the search space configuration. The search space configuration, which the UE obtains from the PBCH decoding, is regarded as one search space configuration having the search space ID to be set to 0 by default. Each search space may contain different configuration for the UE to decode the PDCCH candidates. For example, the search space configuration may include, but is not limited to, a searchSpaceType, such as the Slot Format Indicator (SFI)-PDCCH reception, the downlink preemption indication reception, the UE-specific DCI reception, the system information, etc.; a ControlResourceSetID, where each ControlResourceSetID corresponds to one Control Resource Set (CORESET) configuration (which may also be provided through control signaling, such as dedicated control signaling or broadcast message); and a Control Resource Set which may further include a frequency domain resource location, a start symbol in time domain, the duration of Control Resource Set (Contiguous time duration of the CORESET in number of symbols), pdcch-DMRS-ScramblingID, etc. Other parameters, such as {monitoringSlotPeriodicityAndOffset, monitoringSymbolsWithinSlot, nrofCandidates #1} may also be included in the search space configuration.

As described above, after receiving the search space configuration (e.g., via RRC signaling or through PBCH decoding), the UE may try to decode all of the PDCCH candidates that are included in each one of the search space occasions, based on the parameters in each search space configuration. Also, a single component carrier, in the current NR specification, may include up to 40 search spaces (i.e., including four BWPs, each having, as many as ten search spaces). As such, the process of blind decoding in the next generation networks may become highly power consuming. Additionally, with the introduction of bandwidth part with carrier aggregation, dual connectivity, and multiple connectivity, in the next generation networks, the complexity of the blind decoding process (and the UE power consumption) may become even worse.

FIG. 1 illustrates a component carrier (cell) configured with multiple bandwidth parts (BWPs) on a time-frequency grid, according to an example implementation of the present application. Specifically, FIG. 1 illustrates a component carrier 100 that includes two BWPs 110 and 120. BWP 110 includes the search space 130, and BWP 120 includes the search space 140. Although the component carrier 100 in the illustrated example includes only two BWPs and each of the BWPs 110 and 120 includes only one search space, as described above, each cell, in the current specification of NR, may be configured with up to four BWP(s) and each BWP may be configured with up to ten search space sets (e.g., component carrier 100 may be configured with BWP1-BWP4, BWP 110 may be configured with search spaces 1A-1J, and BWP 120 may be configured with search spaces 2A-2J). Each BWP may have a different numerology, such as subcarrier spacing, and even different frequencies. In the illustrated example, the UE may monitor the search space 130 in the active BWP 110 up until time T1, and at time T1, when BWP 120 becomes active, the UE may switch to monitoring the search space 140 in the active BWP 120.

Under certain circumstances, even though a UE may be configured with up to four BWPs, the UE may only have one active BWP (in time domain) for each cell. However, the UE may switch between the configured BWPs and keep the PDCCH receptions based on all of the configured search spaces, which are preconfigured in RRC signaling, in the active BWP. To support carrier aggregation (CA) and dual-connectivity (DC), in NR, each UE may support up to 16 downlink carriers without DC and 32 downlink carriers with DC. In addition, for the future releases, it has been envisaged that a component carrier may have more than one active BWP and with the potential introduction of multiple connectivity in the future releases, each UE may be configured with more than one component carrier.

To improve the efficiency in the blind decoding process for such configurations, some of the present embodiments may provide a dynamic search space (de)activation mechanism, in which, based on the current conditions of the network and other criteria, different search spaces may be dynamically activated and/or deactivated. For example, the dynamic search space (de)activation mechanism may improve the efficiency of decoding the PDCCH candidates by adjusting the number of monitored search spaces based on the network's real-time traffic conditions and ongoing services. This way, the power consumption at the UE's side may be decreased further without interfering with the Quality-of-Service (QoS) of the ongoing services. Conversely, the deactivated search space monitoring may be reactivated when more packet exchange occurs during the real-time packet transmissions. In other words, the provided mechanism of dynamic search space (de)activation may decrease the UE's power consumption by decreasing unnecessary blind decoding, and may also increase the number of search spaces when more downlink control signaling is needed for the UE(s).

As another example, as discussed, for the future releases, a UE may be configured with more than one active BWP in each cell. However, all of the configured search space sets of all of the active BWPs may not be necessarily monitored by the UE. Since the activation/deactivation of the BWPs may occur frequently, a dynamic activation/deactivation mechanism of the search spaces in each BWP may be more effective. Additionally, in a carrier aggregation scenario, some search spaces of different component carriers may overlap in time domain. However, by enabling cross-carrier scheduling, it may be enough for the UE to detect just a few search spaces in some activate cells, and not all search spaces of the active cells. In implementation, a base station may not configure search spaces to a secondary cell (SCell) when cross-scheduling is configured to the concerned SCell (e.g., through RRC signaling). However, considering the latency in control signaling of the RRC message, a dynamic activation/deactivation mechanism of the search spaces is more effective. In addition, by allowing dynamic search space (de)activation, some embodiment may enable the dynamic (de)activation/(re)activation of cross-carrier scheduling. Similarly, dynamic search space (de)activation in some of the present embodiments may enable cross-BWP scheduling (e.g., when more than one active BWP in each cell is configured).

In some of the present embodiments, a base station may instruct a UE to activate/deactivate one or more search spaces within one or more BWPs through dedicated control signaling. The dedicated control signaling, in some aspects of the present embodiments, may include Downlink Control Information (DCI) signaling and/or Medium Access Control (MAC) Control Element (CE) signaling. In one aspect of the present embodiments, the base station may deliver the control signaling within the same BWP that includes the (de)activated search space (i.e., intra-BWP search space (de)activation). In another aspect of the present embodiments, the base station may deliver the control signaling in a first BWP to activate/deactivate a search space in a second BWP. In some of the present embodiments, the first and second BWPs may be within one cell/component carrier (inter-BWP search space (de)activation), or within two different cells (inter-cell search space (de)activation). Using a similar approach to search space activation/deactivation mechanism, some of the present embodiments may activate/deactivate a BWP and/or a component carrier. For example, a base station may deliver control signaling to dynamically activate/deactivate cross-BWP scheduling, and/or cross-carrier scheduling.

A base station (e.g., a master gNB), in one aspect of the present embodiments, may deliver dedicated control signaling in a BWP of one cell group, such as a BWP of a Master Cell Group (MCG), to activate/deactivate the search spaces configured in another cell group, such as a search space (e.g., configured to the UE) in a Secondary Cell Groups (SCG) (inter-cell group search space (de)activation). Some of the present embodiments may apply the same mechanism of search space activation/deactivation in a multiple secondary cell groups scenario.

Figure 2:
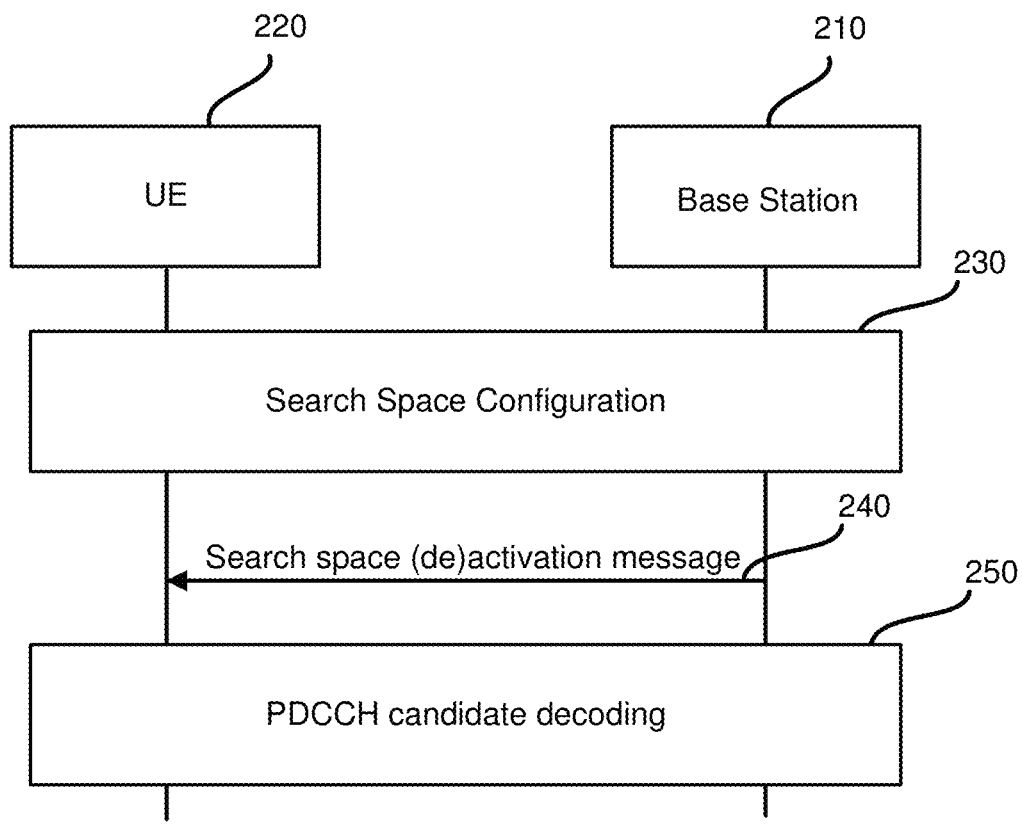
FIG. 2 is a diagram illustrating communications between a base station and a UE for configuring a search space and activating/deactivating the search space, according to an example implementation of the present application.

FIG. 2 is a diagram illustrating communications between a base station and a UE for configuring a search space and activating/deactivating the search space, in accordance with some aspects of the present application. The base station 210 (e.g., a gNB) may first configure a search space to the UE 220 using the search space configuration 230. The base station 210 may then activate/deactivate the configured search space through a dedicated control signaling 240 (e.g., using DCI signaling or Medium Access Control (MAC) Control Element (CE) signaling). For example, the base station 210 may propagate the parameters of the DCI to indicate to the UE 220 that the DCI is for (de)activating one or more search spaces. The configured DCI may further indicate to the UE which search space(s) should be activated and/or deactivated. The UE 220, after receiving the configured DCI, may perform the PDCCH candidates decoding process 250 by either decoding the PDCCH candidates within a search space, if the received DCI indicates the activation of the search space. Alternatively, the UE 220 may stop decoding the PDCCH candidates within a search space, if the received DCI indicates the deactivation of the search space.

In some of the present embodiments, the default settings (configuration) of the search space and the activation/deactivation of the BWP including the search space may further influence the search space (de)activation procedure. For example, in one aspect of the present embodiments, a search space may be activated by default after the UE receives the search space configuration (e.g., through RRC signaling) from the base station. As such, the search space may be activated automatically after the corresponding BWP that includes the search space is activated. In some of the present embodiments, the activated search space may stay valid even after the corresponding BWP is deactivated (e.g., after the serving gNB sends a DCI message to indicate to the UE to switch to another BWP (or after the BWP switch timer, e.g., BWPInactivityTimer configured to the UE, expires). The UE may resume monitoring the search space directly (without receiving any further activation message from the base station) after the corresponding BWP is reactivated.

In another aspect of the present embodiments, a search space may be deactivated by default after the UE receives the search space configuration from the base station. In these embodiments, the base station may need to deliver a search space activation message to activate the search space after transmitting the search space configuration to the UE. In addition, the search space may be deactivated after the corresponding BWP is deactivated. In some such embodiments, even after the corresponding BWP is reactivated, the base station may still need to deliver the search space activation message to the UE to activate the search space again.

In another aspect of the present embodiments, a search space may be deactivated by default. In these embodiments, the base station may need to deliver a search space activation message to the UE to activate the search space after transmitting the search space configuration. However, after being activated by the base station, the search space may not be affected by the deactivation of the corresponding BWP. In yet another aspect of the present embodiments, a search space may be activated by default and the base station may need not to deliver a search space activation message to activate the search space after transmitting the search space configuration. However, the search space may be deactivated after the corresponding BWP is deactivated. Even after the corresponding BWP is reactivated, in some such embodiments, the base station may still need to deliver the search space activation message to the UE to reactivate the search space.

In some aspects of the present embodiments, the base station may indicate the default settings (e.g., the activation status) of a search space in the search space configuration (e.g., received through RRC signaling). In some such embodiments, the activation status of the search space may be independent of the activation status of the BWP associated with the search space. In some other aspects of the present embodiments, although the base station may indicate the default settings (e.g., the activation status) of a search space in the search space configuration, the activation status of the search space may depend on the activation status of the BWP including the search space. For example, the search space may be deactivated with the deactivation of the corresponding BWP. In some of these embodiments, however, when the corresponding BWP is reactivated, the base station may still need to deliver a search space activation message to reactivate the search space.

In some aspects of the present embodiments, the base station may apply different search space configurations to the same UE. For example, for a (cell-specific) common search space, the UE may be configured to activate the common search space by default after the UE receives the search space configuration, and the common search space may stay activated even after the corresponding BWP is deactivated. Conversely, a UE-specific search space may be configured to the UE such that the search space may be deactivated by default (e.g., after the UE receives the search space configuration) and the base station may need to deliver a search space activation message to activate the search space. The UE-specific search space may be deactivated after the corresponding BWP is deactivated and stay deactivated even after the corresponding BWP is reactivated. That is, for reactivating the UE-specific search space (unlike the common search space), the base station may still need to deliver the search space activation message to the UE to reactivate the search space.

Similarly, for inter-BWP/inter-cell/inter-cell group scenarios, or even intra-BWP/intra-cell/intra-cell group scenarios, in some scenarios, the activation/deactivation of the search spaces may depend on whether the associated BWPs is activated, or may be independent of the activation status of the associated BWPs. For example, in some aspects of the present embodiments, the base station may deliver the search space monitoring activation/deactivation message for search spaces that are associated with active BWP(s) only. Conversely, in some other aspects of the present embodiments, the base station may deliver the activation/deactivation message for the search spaces that are associated with a BWP, regardless of the corresponding BWP's activation status. The rules regarding the activation status of the search spaces may be defined in technical specifications or may be configured through control signaling (e.g., RRC signaling) to different UEs in some of the present embodiments.

Figure 3:
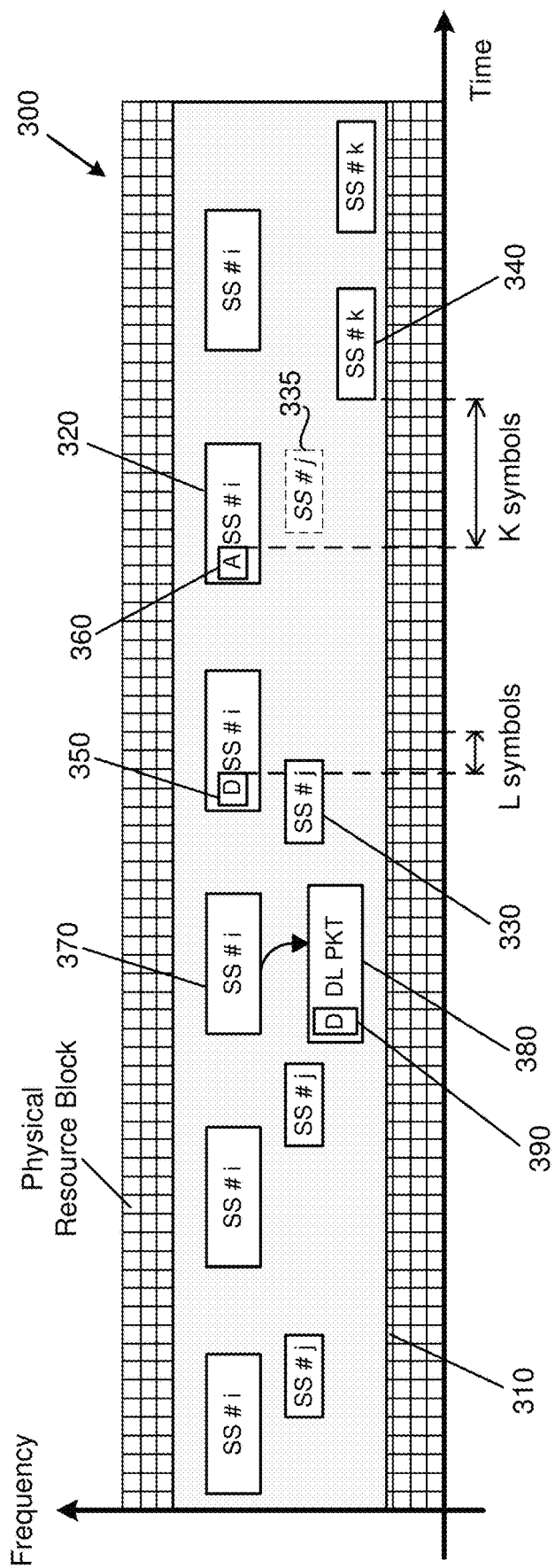
FIG. 3 illustrates activation and deactivation of the search spaces in an intra-BWP search space monitoring scenario with one component carrier having one active BWP, according to an example implementation of the present application.

FIG. 3 illustrates activation and deactivation of the search spaces in an intra-BWP search space monitoring scenario with one component carrier having one active BWP, in accordance with various aspects of the present application. As illustrated in FIG. 3, the component carrier 300 may include one active BWP 310. In addition, the UE may have two search spaces SS #i (e.g., SS 320) and SS #j (e.g., SS 330) that are configured to the UE. The SS #i and SS #j occasions may appear in the component carrier 300 periodically, according to the search spaces' configurations. The base station (not shown in the figure) may transmit a search space deactivation message 350 in SS 320 for deactivating SS #j. The search space deactivation message 350 may be a DCI message, as discussed above. After receiving the search space deactivation message 350, the UE may stop monitoring the following SS #j occasions (e.g., SS 335 and the other SS #j occasions after SS 335 in time domain). That is, the UE may forgo decoding the PDCCH candidates included in any of the SS #j occasions that follows (in the time domain) the receipt of the search space deactivation message 350, such as the deactivated search space SS 335 in the illustrated example.

As shown in FIG. 3, the base station may deliver the search space deactivation message 350 at a time when the UE is still monitoring an ongoing SS #j occasion (e.g., SS 330) which may include (at least) one scheduled DCI transmitted for the UE. In order to avoid missing any scheduled DCI, in some aspects of the present embodiments, the UE may continue monitoring the search space after receiving the deactivation message for a certain (de)activation time delay. The time delay may include, in some of the present embodiments, a particular number of symbols (e.g., L symbols, L≥0). That is, the UE may still monitor the ongoing search space occasions, but not longer than L symbols after receiving the search space deactivation message. This is because, in some of the present embodiments, the base station may still send the DCIs that have been scheduled before the search space deactivation message via SS #j occasion during the L symbols time delay. After the L symbols time delay, the UE may deactivate the SS #j configuration and stop monitoring any potential following SS #j occasion in the time domain. In some other embodiments, the UE may not expect the base station to send any DCI via SS #j during the L symbols time delay since the UE does not guarantee DCI reception during the L symbols.

The number of symbols (L) for the time delay may be a fixed value (e.g., in the technical specification) in some aspects of the present embodiments, while in other aspects of the present embodiments, the number of symbols may be a variable number, e.g., depending on the UE's hardware capability. In yet some other embodiments, the number of symbols for the time delay may be configured by the base station. For example, in some of the present embodiments, the base station may define the time delay while configuring the search spaces to the UE (e.g., through RRC signaling), while in other embodiments the time delay may be defined in the search space deactivation message itself. In addition, in some implementations, the UE may not be expected to receive a search space activation message for the same search space during the L' symbols (e.g., L'≥L) in the time domain after the UE receives the search space deactivation message for the concerned target search space. The UE may obtain the value of L' based on the approaches also provided above for the acquisition of value of L. In some other embodiments, the UE may implicitly know that the value of L' is the same as the value of L.

Similar to transmitting a deactivation message for deceiving a search space monitoring in the BWP, the base station may transmit an activation message for activating a search space monitoring by the UE. As shown in FIG. 3, the base station may transmit a search space activation message 360 also in SS #i (e.g., SS 320) to activate a new search space SS #k (SS 340 and the other SS #k occasions after SS 340 in time domain)). After receiving the search space activation message 360, in some of the present embodiments, the UE may start monitoring the following SS #k occasions (in the time domain) continuously based on the SS #k configuration the UE has previously received. Similar to deactivation procedure, in some of the present embodiments, a minimum K symbols time delay may pass before the UE starts monitoring the search space SS #k after receiving the intra-BWP search space activation message 360. Therefore, the UE may receive the first activated SS #k occasion not before K symbols after receiving the intra-BWP search space activation message 360. In some of the present embodiments, the base station may consider the limitation of K symbols when transmitting the scheduled DCI(s) on the newly activated search space (i.e., there shouldn't be any scheduled DCI to the UE during the K symbols time delay).

The value of K (i.e., the time offset between receiving the activation message and starting to monitor the activated search space, K≥0) may be a fixed value (e.g., in the technical specification) in some of the present embodiments, or may be a variable depending on the UE's hardware capability in some other aspects of the present embodiments. In some of the present embodiments, the value of K may be configured by the base station during the search space configuration (e.g., via RRC signaling), or alternatively, the value of K may be transmitted to the UE through the search space activation message 360.

In addition, in some implementations, the UE may not be expected to receive a search space deactivation message for the same search space during the K' symbols (e.g., K'≥K) in the time domain after the UE receives the search space activation message for the concerned target search space. The UE may obtain the value of K' based on the approaches also provided above for the acquisition of value of K. In some other embodiments, the UE may implicitly know that the value of K' is the same as the value of K.

As described above, a search space (de)activation message may be transmitted to the UE via a DCI message or a MAC CE message in some of the present embodiments. Also, as shown in FIG. 3, the UE may obtain one downlink packet assignment (e.g., DL PKT 380) after decoding the PDCCH candidates of one search space occasion (e.g., SS 370). In addition, the DL PKT 380 may include one (or more) MAC CE, which may include the search space (de)activation message. The (de)activation message (being transmitted by DCI or by MAC CE), in some of the present embodiments, may at least include a type field for distinguishing the (de)activation message from other types of DL control signaling, an activation status field for indicating whether the message is for activation or deactivation of the search space, and a search space index field for specifying which configured search space(s) should be activated or deactivated.

The type field may further indicate what category of search space monitoring the message has been sent for. For example, the type field may indicate that the message is related to an intra-BWP search space monitoring, an inter-BWP search space monitoring, an inter-cell search space monitoring, etc. In some of the present embodiments, for a DCI signaling design, the type field may be delivered to the UE using an implicit approach. For example, one or more specific information elements, or fields, (e.g., identifier for DCI formats, frequency domain resource assignment, time domain resource assignment, frequency hopping flag, modulation and coding scheme, new data indicator, redundancy version, HARQ process number, Transmit Power Control command, UL/Supplementary UL (SUL) indicator, Cell ID, bandwidth part indicator, rate matching indicator, padding bits, or any combination of the aforementioned fields) in the DCI may be set to specific values (e.g., all of the fields may be set to '0' or '1') to indicate the type of the message.

For a MAC CE signaling design, in some of the present embodiments, the type field may be delivered to the UE using an implicit approach. For example, some specific field(s) (e.g., the logical channel ID, the reserved bit(s), the Format field, the Extension field, or any combination of the aforementioned fields) in the MAC CE may be set to specific values (e.g., all of the fields may be set to '0' or '1'). This way, when the UE receives the signaling, the UE may be able to distinguish the search space (de)activation message from the other types of DCI signaling or MAC CE signaling, and the category of the message (e.g., intra-BWP search space (de)activation, inter-BWP search space (de)activation, intra-cell search space (de)activation, inter-cell search space (de)activation, etc.).

The activation status field, in some of the present embodiments, may include a one-bit indicator for explicitly indicating the activation status of the search space(s). For example, a value '1' in the activation status bit may indicate the activation of the search space, while a value '0' in the activation status bit may indicate the deactivation of the search space. For a MAC CE message, there is no need for the one-bit indicator in some of the present embodiments. The UE may take a corresponding action (e.g., deactivate an activated search space, or activate a deactivated search space) based on the current state of the search space that should be changed (e.g., indicated by the following search space index field).

The search space index field, in some of the present embodiments, may include a total of 4 bits to indicate which search space(s) should be activated or deactivated. For example, a combination of '0001' to '1010' in the four-bit field may indicate a one-to-one map to search spaces 0 to 9, respectively. The '0000' value and the '1011' to '1111' values may be kept reserved. As described above, in some of the present embodiments, a base station may activate/deactivate more than one search space in one (de)activation message. As such, the search space index field may include multiple search space indices. In some aspects of the present embodiments, a particular combination of the bits (e.g., the reserved bits) may indicate a particular set of search spaces. For example, a value '1111' in the search space index field may indicate that all of the configured search spaces in one BWP (or cell) are affected (should be activated or deactivated) by the message. Similarly, a '1011' value may indicate that all of the UE's specific search spaces in one BWP/cell are affected, and a '1110' value may indicate that all of the common search spaces in one BWP/cell are affected by the message. Although only three combinations of the reserved bits are discussed here, any other combination of the bits for specifying the affected search spaces may be used in other embodiments of the invention.

In some of the present embodiments, the UE may be provided by a bitmap (e.g., through the control signaling). In some such embodiments, each bit in the bitmap may correspond to one particular search space. For example, the first bit (from left to right in the control signaling) in the bitmap may correspond to the first search space in the search space configuration of the UE, the second bit may correspond to the second search space, etc. Based on the bitmap design sent to the UE, the base station may be able to activate each search space by setting the corresponding bit value for the search space to '1'. Conversely, the base station may deactivate each search space by setting the corresponding bit value for the search space to '0'. The length of such a bitmap, in some aspects of the present embodiments, may depend on the number of search space configurations.

Figure 4:
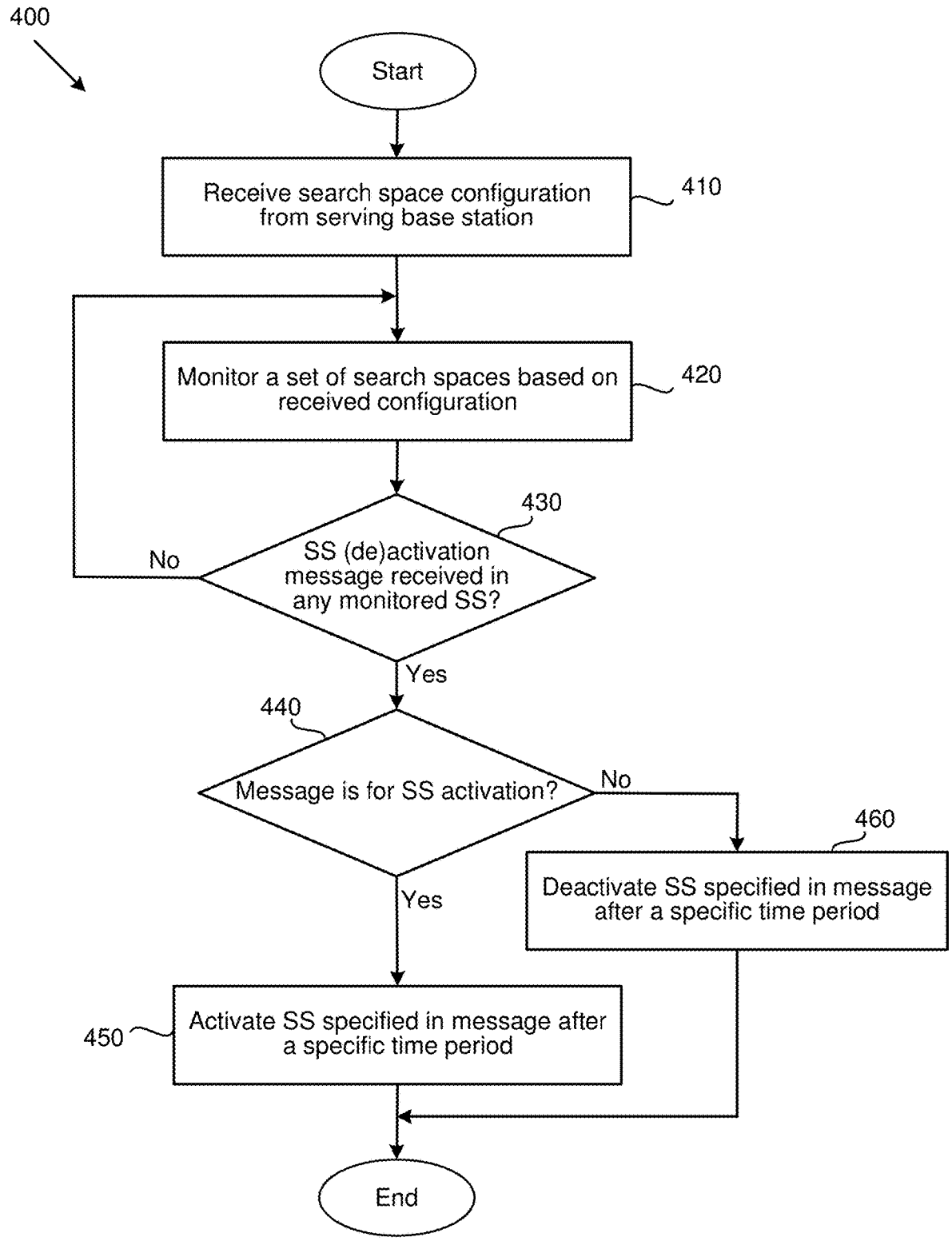
FIG. 4 is a flowchart illustrating a method (or process) performed by a UE for dynamically monitoring different search spaces, according to an example implementation of the present application.

FIG. 4 is a flowchart illustrating a method (or process) 400 performed by a UE for dynamically monitoring different search spaces, according to an example implementation of the present application. The process 400, in some of the present embodiments, may start, at block 410, by receiving search space configuration from a serving base station (e.g., a gNB or an eNB). The UE may receive the search space configuration explicitly (e.g., through RRC signalling), or implicitly (e.g., from PBCH decoding, as described above.

After the UE is configured with the search space configurations, the process 400 may start monitoring, in block 420, one or more search spaces that are configured to the UE. The search spaces may be in the same BWP of the same cell, different BWPs of the same cell, or different BWPs of different cells. By monitoring each search space, the process may decode each PDCCH candidate of that search space to receive the control information that belongs to the UE.

At block 430, the process 400 may determine whether a (de)activation message (i.e., an activation message or a deactivation message) has been received on any of the monitored search spaces. The search space (de)activation message may be a DCI message, as discussed above. When the process 400 determines that none of the decoded PDCCH candidates carry a (de)activation message, the process 400 may return to block 420 to continue monitoring the configured search spaces. However, when the process determines that a (de)activation message is received (e.g., by decoding one of the PDCCH candidates on one of the monitored search spaces), the process 400 may determine, in block 440, whether the received message is for activating (at least) one (deactivated) search space, or for deactivating (at least) one active search space. As discussed below, the received message is not limited to activating and/or deactivating search spaces. As will be described, some embodiments may use the received message for activating and/or deactivating another BWP, another cell, or even another cell group of the corresponding indicated search space.

When the process 400 determines that the message is for deactivating another search space, the process may, at block 460, stop monitoring the following search space occasions that are defined by the search space (de)activation message. That is, the UE may forgo decoding the PDCCH candidates that are included in any of the search space occasions that follows (in the time domain) the receipt of the search space deactivation message. As discussed above, the base station may deliver the search space deactivation message at a time when the UE is still monitoring an ongoing search space occasion which may include (at least) one scheduled DCI transmitted for the UE. In order to avoid missing any scheduled DCI, in some aspects of the present embodiments, the UE may continue monitoring the search space after receiving the deactivation message for a certain time period (e.g., for a particular number of symbols in the associated BWP). After the specific time period is expired, the process 400 may deactivate the search space that is described in the message (i.e., stop monitoring any potential following search space occasion in the time domain). The process 400 may then end.

When the process 400 determines, at block 440, that the message is for activating another search space, the process may, at block 450, start monitoring the following search space occasions based on the configuration of the search space (which was previously received). That is, the UE may start monitoring the following search space occasions (in the time domain) continuously based on the configuration the UE has previously received. Similar to deactivation procedure, in some of the present embodiments, a minimum K symbols time delay, wherein K≥0, may pass before the UE starts monitoring the search space after receiving the search space activation message. Therefore, the UE may receive the first activated search space occasion not before K symbols after receiving the search space activation message. In addition, the UE may not expect to receive a search space deactivation message for the same search space during the K' symbols (e.g., K'≥K) in time domain after the UE receives the search space activation message for the concerned target search space. In some other embodiments, the UE may implicitly know that the value of K' is the same as the value of K.

The time delay between receiving the activation message and starting to monitor the activated search space, or between receiving the deactivation message and stopping to monitor the deactivated search space may be a fixed value (e.g., in the technical specification) in some of the present embodiments, or may be a variable depending on the UE's hardware capability in some other aspects of the present embodiments. In some of the present embodiments, the time delay may be configured by the base station during the search space configuration (e.g., via RRC signaling), or alternatively, the offset time may be transmitted to the UE through the search space (de)activation message itself (e.g., as one of the information elements of the message). In some of the present embodiments, the process may have to activate a BWP, or even a cell, before activating the search space associated with the BWP (or the cell). After activating the search space, the process may end.

Figure 5:
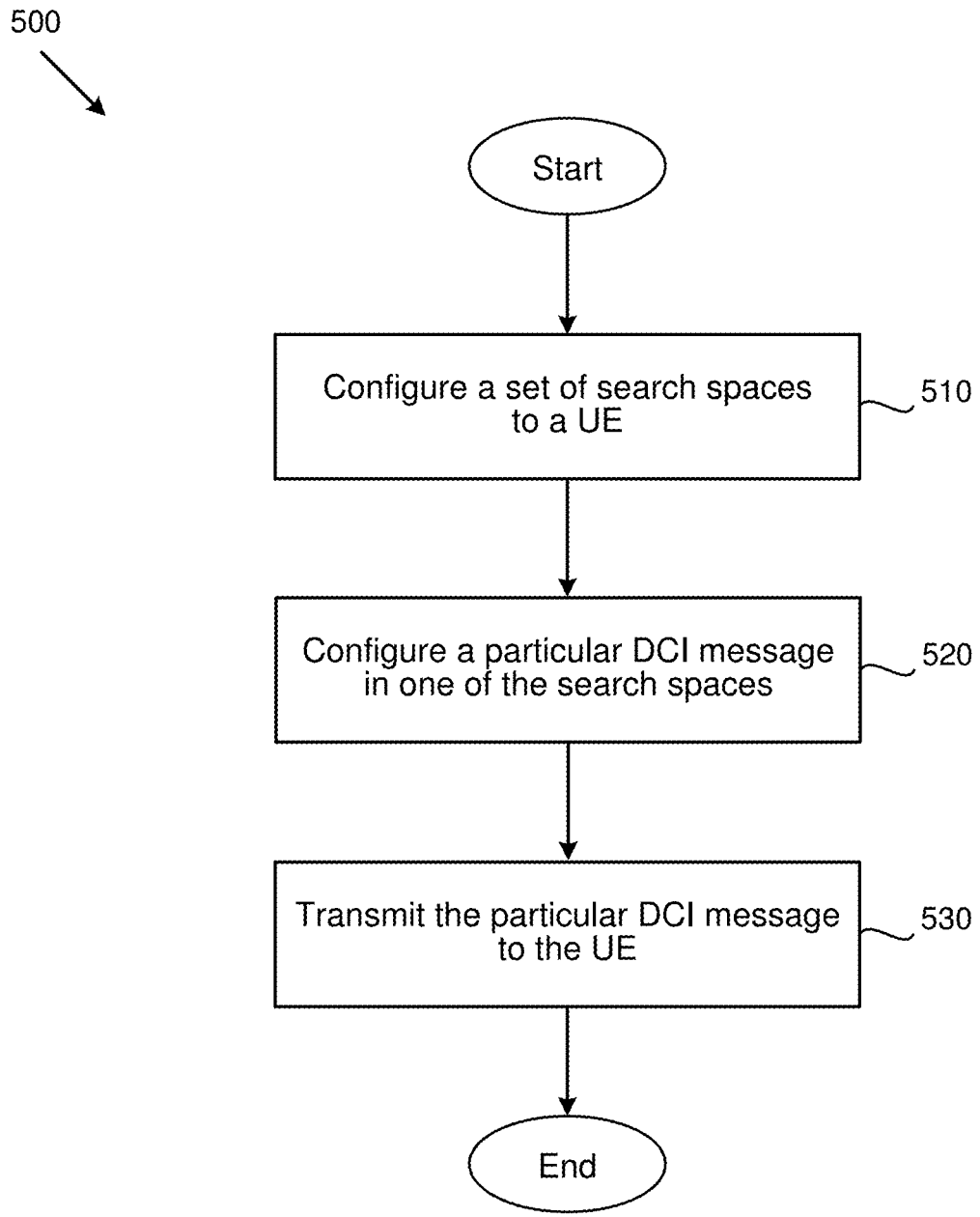
FIG. 5 is a flowchart illustrating a method (or process) performed by a base station for dynamically (de)activating one or more search spaces, according to an example implementation of the present application.

FIG. 5 is a flowchart illustrating a method (or process) 500 performed by a base station for dynamically (de)activating one or more search spaces, according to an example implementation of the present application. As illustrated in FIG. 5, the process 500 may start by configuring, at block 510, one or more search spaces to a UE. As described above, the process 500 may configure the search space(s) via RRC signalling.

At block 520, the process 500 may configure a particular DCI message in one of the already configured and active search spaces (e.g., a configured search space that is being monitored by the UE). In some of the present embodiments, the process 500 may configure the particular DCI by populating a set of parameters (e.g., information elements), such as a search space type field, a search space activation status field, a search space index field, etc. The aforementioned elements may indicate to the UE which search space, in what BWP (and cell), and under what scenario has to be activated and/or deactivated.

After configuring the DCI message, at block 530, may transmit the DCI message to the desired UE. In some aspects of the present embodiments, the process 500 may transmit the message using one or more PDCCH candidates transmitted on one of the active search spaces that the UE is monitoring. The process may then end.

The above-described method of dynamic search space (de)activation is not limited to slot-based scheduling mechanism. Some of the present embodiments may provide a similar method for non-slot based scheduling, in which, the search space occasion may not be necessarily periodic. In some of the present embodiments, in a non-slot based scheduling scenario, the search space activation/deactivation may be configured in symbol level (e.g., in symbol or in mini-slot).

Figure 6:
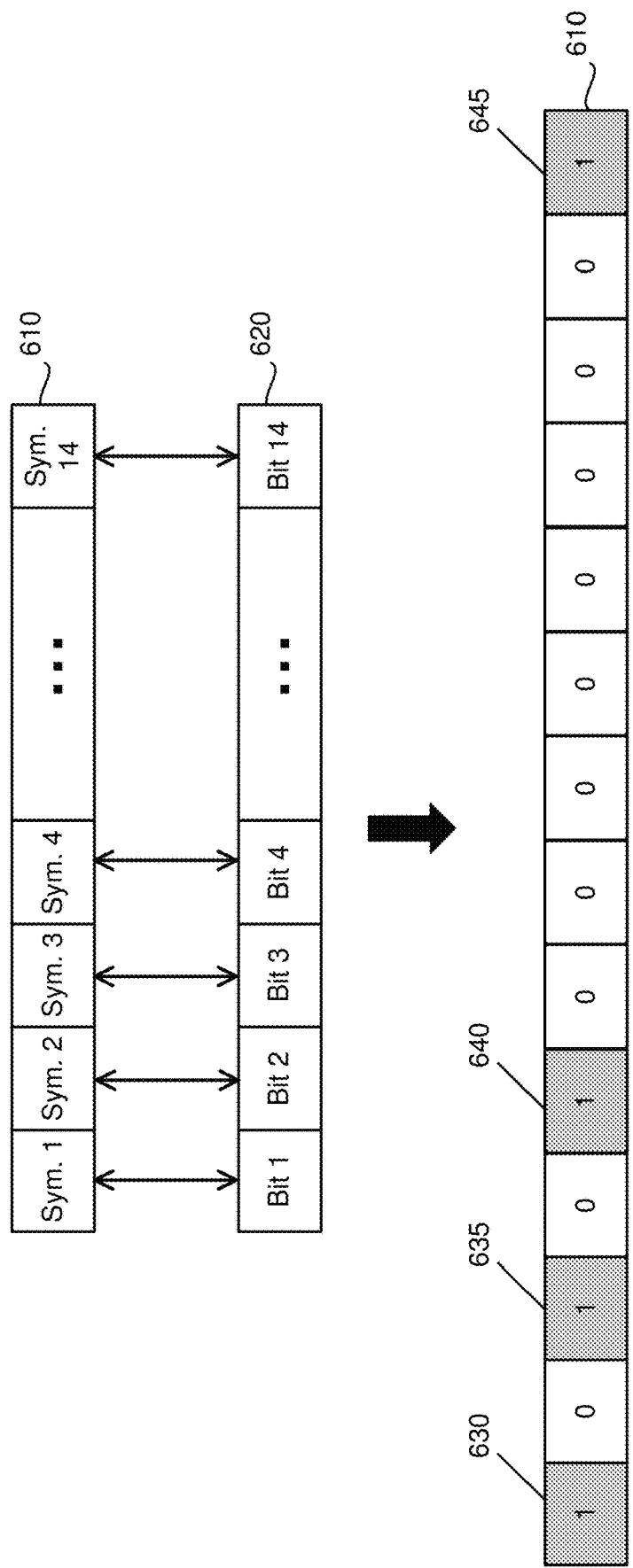
FIG. 6 illustrates activation and deactivation of the search spaces in a non-slot based scheduling scenario, according to an example implementation of the present application.

FIG. 6 illustrates activation and deactivation of the search spaces in a non-slot based scheduling scenario, in accordance with various aspects of the present application. In some of the present embodiments, the base station may configure the search space monitoring periodicity in a slot level (e.g., the UE may monitor one slot in every ten slots), and the location of the slot that the UE should monitor (e.g., by providing an offset value to the UE within a monitoring period). The UE may calculate the target slot 610 that the base station needs to monitor, based on the received configuration. For example, the UE may start calculating from the first slot at the beginning of one radio frame.

After finding out the target slot 610, the UE may find the locations of the search space occasions in the target slot 610. In some aspect of the present embodiments, an information element, such as the 14-bit MonitoringSymbolsWithinSlot field 620 may be configured within the search space configuration, each bit of which, may correspond to one symbol in the target slot 610 on which the UE prepares to do the monitoring (i.e., the PDCCH decoding). Although in the example shown in FIG. 6, the MonitoringSymbolsWithinSlot field 620 is 14 bits, it should be noted that in other embodiments this information element may be a bit string as many bits as the number of the symbols in one slot. As described above, each bit in the MonitoringSymbolsWithinSlot field 620 may correspond to one symbol in the target slot 610. As such, in some of the present embodiments, if a bit of the MonitoringSymbolsWithinSlot field 620 is set to 1', the UE may consider the corresponding symbol in the target slot 610, as an activated search space occasions that should be monitored by the UE. On the other hand, if a bit in this field is set to '0', the UE may determine that the corresponding symbol in the target slot 610 is not an activated search space occasion and the UE should not monitor the corresponding symbol(s). As shown in FIG. 6, according to the example combination of bit values in the MonitoringSymbolsWithinSlot field 620, the first symbol (630), third symbol (635), fifth symbol (640), and fourteenth symbol (645) of the target slot 610 are activated search spaces that may be monitored by the UE.

Figure 7:
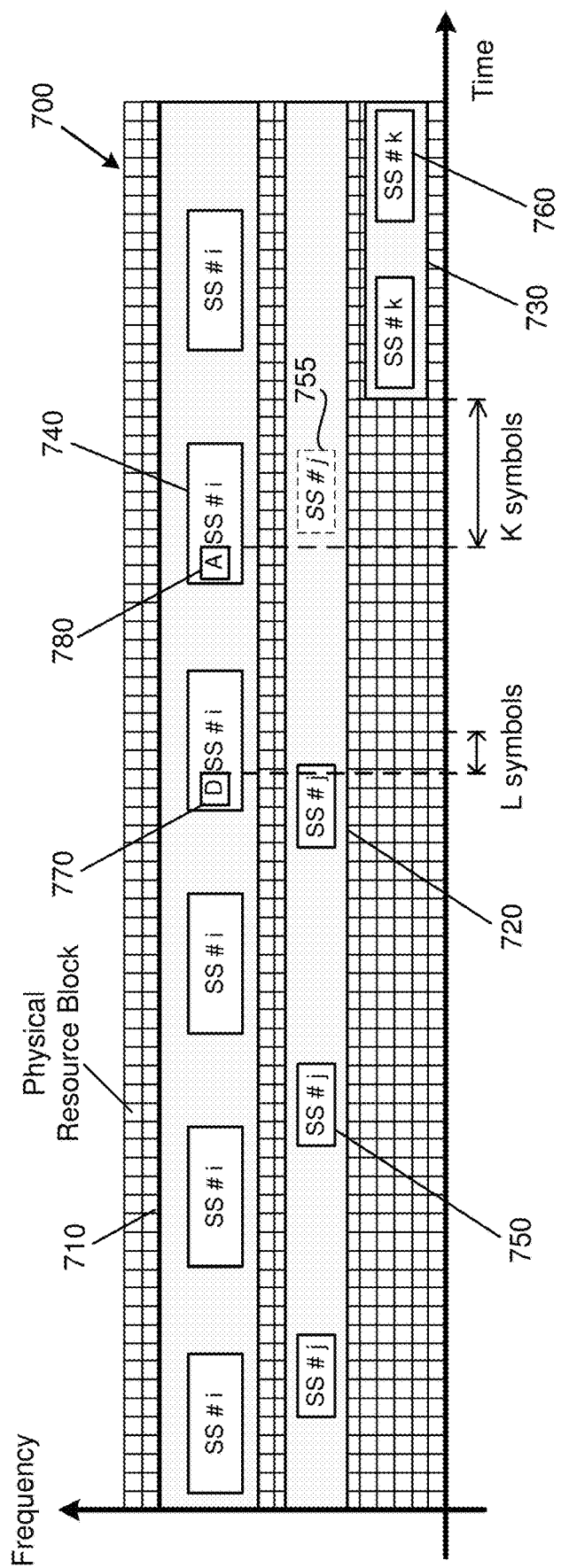
FIG. 7 illustrates activation and deactivation of the search spaces in an inter-BWP search space monitoring scenario with one component carrier having multiple active BWPs, according to an example implementation of the present application.

FIG. 7 illustrates activation and deactivation of the search spaces in an inter-BWP search space monitoring scenario with one component carrier having multiple active BWPs, in accordance with various aspects of the present application. As shown in FIG. 7, the UE has two active (e.g., activated by default) BWPs 710 and 720 configured in one active component carrier 700. In addition, a configured BWP 730 is not active at the beginning of the illustrated time-frequency grid. The active BWP 710 includes the search space SS #i (e.g., SS 740), while the active BWP 720 includes the search space SS #j (e.g., SS 750). The base station may then transmit an inter-BWP search space deactivation message 770 in the SS #i to deactivate the SS #j in the other active BWP 720 (e.g., SS 755 and the other SS #j occasions after SS 755 in time domain). After receiving the inter-BWP search space deactivation message 770, the UE may stop monitoring the search space SS #j. As shown in the figure, SS 755 is deactivated after receiving the inter-BWP search space deactivation message 770.

Similar to the intra-BWP deactivation scenario, there may be a minimum L symbols time delay for the UE to enable the search space deactivation after receiving an inter-BWP search space deactivation message 770. Therefore, a UE may still monitor the ongoing search space occasion (e.g., SS #j) during the L symbols after receiving the search space deactivation message. The base station, may still send any DCI that has been scheduled before the search space deactivation message 770 to the UE using the SS #j occasion during the L symbols time delay. After the L symbols time delay, the UE may deactivate the search space SS #j and stop monitoring the potential following SS #j occasions (i.e., the SS 755 and the other SS #j occasions after SS 755 in time domain). The value of L may be a fixed value (e.g., in the technical specification) or may be a variable depending on the UE's hardware capability. Alternatively, the value of L may be configured by the base station (e.g., via RRC signaling or through the search space deactivation message 770). In addition, in some implementations, the UE may not be expected to receive a search space activation message for the same search space during the L' symbols (e.g., L'≥L) in the time domain after the UE receives the search space deactivation message for the concerned target search space. The UE may obtain the value of L' based on the approaches also provided above for the acquisition of value of L. In some other embodiments, the UE may implicitly know that the value of L' is the same as the value of L.

As shown in FIG. 7, after sending the inter-BWP search space deactivation message 770, the base station may transmit an inter-BWP search space activation message 780 in the SS #i (e.g., in a DCI signal included in a PDCCH candidate of the search space 740) to activate the SS #k, which is included in the BWP 730. After receiving the inter-BWP search space activation message 780 (e.g., by decoding the PDCCH candidate that carries the DCI signal indicating the activation message), the UE may start monitoring the SS #k in the active BWP 730 (e.g., SS 760 and the other SS #k occasions after SS 760 in time domain). It should be noted that BWP 730 is not active before the UE receives the inter-BWP search space activation message 780 (to activate SS #k). As such, after receiving the inter-BWP search space activation message 780, the UE may activate BWP 730 first and then start monitoring the SS #k occasions continuously based on the configuration of the SS #k.

Also, as illustrated in FIG. 7, there may be a minimum K symbols time delay for the UE to prepare for search space decoding after receiving the inter-BWP search space activation message 780. The value of K may be a fixed value (e.g., defined in the technical specification) or may be a variable that depends on the UE's hardware capability. Furthermore, the value of K may be configured by the base station (e.g., through RRC signaling or via the search space activation message). Therefore, the UE may receive the first SS #k occasion (e.g., SS 760) no sooner than K symbols after receiving the inter-BWP search space activation message 780. In some of the present embodiments, the base station may consider the limitation of K symbols when transmitting the DCI(s) on a search space that is just activated by the base station. Therefore, no DCI may be provided to the UE during the K symbols time delay. In addition, in some implementations, the UE may not be expected to receive a search space deactivation message for the same search space during the K' symbols (e.g., K'≥K) in the time domain after the UE receives the search space activation message for the concerned target search space. The UE may obtain the value of K' based on the approaches also provided above for the acquisition of value of K. In some other embodiments, the UE may implicitly know that the value of K' is the same as the value of K.

Also, as described above, the inter-BWP search space (de)activation message may also be transmitted to the UE via a MAC CE message in some of the present embodiments. the UE may obtain one downlink packet assignment after decoding the PDCCH candidates of one search space occasion in one active BWP (e.g., SS #i in BWP 710). In addition, the downlink packet may include one (or more than one) MAC CE, which includes (at least) one search space (de)activation message to deactivate the search space in another BWP (e.g., the SS #j in the BWP 720) or to activate the search space in another BWP (e.g., the SS #k in the BWP 730).

Some aspects of the present embodiments may use the search space (de)activation message to (de)activate one or more BWPs. For example, in an inter-BWP search space activation scenario in which the UE may be configured with one active BWP in one cell, a BWP indicator may be included in the search space activation message in some of the present embodiments. After receiving the inter-BWP search space activation message, the UE may switch from the operating BWP to the new BWP indicated by the inter-BWP search space activation message. In some such embodiments, the UE may start monitoring (i.e., blind decoding) only the search space(s) which is activated by default (e.g., through search space configuration), or activated by a (intra-BWP/inter-BWP/inter-cell/inter-cell group) search space activation message. Similarly, in an inter-BWP search space activation scenario in which the UE may be configured with more than one active BWP in one cell, a BWP indicator may be included in the search space activation message in some of the present embodiments. After receiving the search space activation message, the UE may activate the BWP indicated by the search space activation message. In addition, the UE may start blind decoding only on the search space(s) that are activated by default (e.g., through search space configuration), or activated by a (intra-BWP/inter-BWP/inter-Cell/inter-Cell Group) search space activation message.

Similar to the intra-BWP scenario, the inter-BWP search space (de)activation message, in a DCI design, may include a Type field for indicating the type of the search space (de)activation. For example, a value '1' in the type field may indicate an intra-BWP search space (de)activation, while a value '2' in the type field may indicate an inter-BWP search space (de)activation. Also, Similar to the design in the intra-BWP activation message, in some of the present embodiments, the type is delivered to the UE using an implicit approach in DCI signaling. For example, some specific field(s) in the DCI may be set to specific values (e.g. to '0' or '1'). This way, the UE may be able to distinguish the inter-BWP search space (de)activation message from other types of DL control signaling. For a MAC CE message delivery design, in some of the present embodiments, the type field may be delivered using an implicit approach. For example, some specific field(s) in the MAC CE may be set to specific values (e.g., '0' or '1') so that the UE may be able to distinguish the inter-BWP search space (de)activation message from other types of MAC CE(s).

The activation status field and the search space index field in an inter-BWP search space (de)activation message, in some of the present embodiments, may be defined in the same way, as described above with reference to FIG. 3 and how these fields are defined in an intra-BWP search space (de)activation message. However, for the search space index field, since there may be multiple BWPs with active search spaces, the base station may further indicate the corresponding BWP of the (de)activated search space in the search space index field of the inter-BWP search space (de)activation message.

Figure 8:
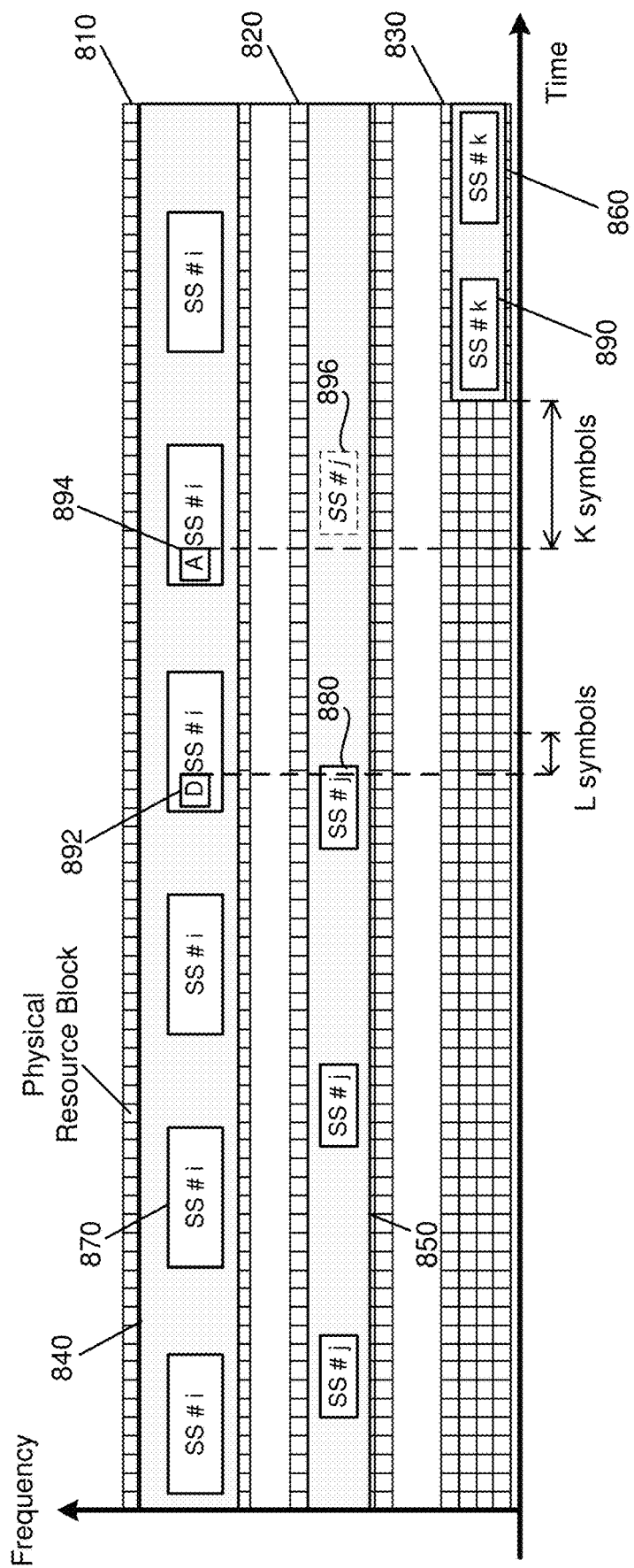
FIG. 8 illustrates activation and deactivation of the search spaces in an inter-cell search space monitoring scenario with multiple component carriers (CCs) having multiple BWPs, according to an example implementation of the present application.

FIG. 8 illustrates activation and deactivation of the search spaces in an inter-cell search space monitoring scenario with multiple component carriers (CCs) having multiple BWPs, in accordance with various aspects of the present application. As shown in FIG. 8, the UE may have two active component carriers (e.g., component carriers 810 and 820) with associated serving cells (which are not shown in FIG. 8) operating on each of the active component carriers, respectively. So, the UE may be configured with at least one search space in each component carrier (e.g., search space SS #i (e.g., SS 870) in CC 810, and search space SS #j (e.g., SS 880) in CC 820). In addition, the UE may have an inactive component carrier (e.g., CC 830) which is not activated at the beginning of the illustrated time-frequency grid, and may be further configured with at least one search space in the inactive component carrier (e.g., search space SS #k in CC 830). Also as shown in the figure, each of the component carriers may have (at least) one BWP that includes the search spaces (e.g., CC 810 includes BWP 840, CC 820 includes BWP 850, and CC 830 includes the BWP 860). Each active CC may be associated with a serving cell to exchange data with the UE on the corresponding BWP(s).

The base station may then transmit an inter-cell search space deactivation message 892 in the SS 870 to deactivate the SS 880 in the other active CC 820. After receiving the inter-cell search space deactivation message 892, the UE may stop monitoring the search space SS #j after receiving the SS 880 or during the SS 880. As shown in the figure, SS #j after (which also includes) the SS 896 in time domain is deactivated after receiving the inter-cell search space deactivation message 892.

Similar to the intra-BWP deactivation scenario, there may be a minimum L symbols time delay (e.g., L≥0) for the UE to enable the search space deactivation after receiving an inter-cell search space deactivation message 892. Therefore, a UE may still monitor the ongoing search space occasion during the L symbols after receiving the search space deactivation message. The base station may still send any DCI that has been scheduled before the search space deactivation message 892 to the UE using the SS #j occasion during the L symbols time delay. After the L symbols time delay, the UE may deactivate the SS #j (e.g., SS 896 and the other SS #j occasions after SS 896 in time domain) and stop monitoring the potential following SS #j occasions (e.g., the SS 896). The value of L may be a fixed value (e.g., in the technical specification) or may be a variable depending on the UE's hardware capability. Alternatively, the value of L may be configured by the base station (e.g., via RRC signaling or through the search space deactivation message 892).

In addition, in some implementations, the UE may not be expected to receive a search space activation message for the same search space during the L' symbols (e.g., L'≥L) in the time domain after the UE receives the search space deactivation message for the concerned target search space. The UE may obtain the value of L' based on the approaches also provided above for the acquisition of value of L. In some other embodiments, the UE may implicitly know that the value of L' is the same as the value of L.

As shown in FIG. 8, after sending the inter-cell search space deactivation message 892, the base station may transmit an inter-cell search space activation message 894 on the SS #i (e.g., in a DCI signal included in a PDCCH candidate of the SS #i) to activate the SS #k (e.g., SS 890), which is included in the CC 830. After receiving the activation message 894 (e.g., by decoding the PDCCH candidate that carries the DCI signal indicating the activation message), the UE may start monitoring the SS #k in the recently activated CC 830 (and recently activated BWP 860). It should be noted that CC 830 is not active before the UE receives the activation message 894 (to activate SS #k). As such, after receiving the inter-cell search space activation message 894, the UE may activate CC 830 (as well as BWP 860) first and then start monitoring the SS #k (e.g., SS 890 and the following SS #k occasions in time domain) continuously based on the configuration of the SS #k.

Also, as described above, the inter-cell search space (de)activation message may also be transmitted to the UE via a MAC CE in some of the present embodiments. For example, the UE may obtain one downlink packet assignment after decoding the PDCCH candidates of one search space occasion in one active BWP of one active cell (e.g., SS #i of BWP 840 in the CC 810). In addition, the downlink packet may include one (or more than one) MAC CE, which includes (at least) one search space (de)activation message to deactivate the search space in another BWP of another active cell (e.g., the SS #j of BWP 850 in the CC 820) or to activate the search space in another BWP of another active cell (e.g., the SS #k of BWP 860 in the CC 830).

Also, as illustrated in FIG. 8, there may be a minimum K symbols time delay for the UE to prepare for search space decoding after receiving the inter-cell search space activation message 894. The value of K may be a fixed value (e.g., defined in the technical specification) or may be a variable that depends on the UE's hardware capability. Furthermore, the value of K may be configured by the base station (e.g., through RRC signaling or via the search space activation message). Therefore, the UE may receive the first SS #k occasion (SS 890) no sooner than K symbols after receiving the inter-cell search space activation message 894. In some of the present embodiments, the base station may consider the limitation of K symbols when transmitting the DCI(s) on a search space that is just activated by the base station. Therefore, no DCI may be provided to the UE during the K symbols time delay.

In addition, in some implementations, the UE may not be expected to receive a search space deactivation message for the same search space during the K' symbols (e.g., K'≥K) in the time domain after the UE receives the search space activation message for the concerned target search space. The UE may obtain the value of K' based on the approaches also provided above for the acquisition of value of K. In some other embodiments, the UE may implicitly know that the value of K' is the same as the value of K.

Some aspects of the present embodiments may use the search space (de)activation message to (de)activate one or more cells. For example, in an inter-cell search space activation scenario in which the UE may be configured with one active cell, a cell indicator may be included in the search space activation message in some of the present embodiments. After receiving the inter-cell search space activation message, the UE may directly activate the cell that is indicated in the activation message. In some such embodiments, the UE may start monitoring (i.e., blind decoding) only the search space(s) which is activated by default (e.g., through search space configuration), or activated by a (intra-BWP/inter-BWP/inter-cell/inter-cell group) search space activation message.

Similar to the inter-BWP scenario, the inter-cell search space (de)activation message, in a DCI design, may include a Type field for indicating the type of the search space (de)activation. For example, a value '1' in the type field may indicate an intra-BWP search space (de)activation, a value '2' in the type field may indicate an inter-BWP search space (de)activation, and a value '3' in the type field may indicate an inter-cell search space (de)activation. Also, Similar to the design in the inter-BWP activation message, in some of the present embodiments, the type is delivered to the UE using an implicit approach in DCI signaling. For example, some specific field(s) in the DCI may be set to specific values (e.g. to '0' or '1'). This way, the UE may be able to distinguish the inter-cell search space (de)activation message from other types of DL control signaling. For a MAC CE message delivery design, in some of the present embodiments, the type field may be delivered using an implicit approach. For example, some specific field(s) in the MAC CE may be set to specific values (e.g., '0' or '1') so that the UE may be able to distinguish the inter-cell search space (de)activation message from other types of MAC CE(s).

The activation status field and the search space index field in an inter-cell search space (de)activation message, in some of the present embodiments, may be defined the same way, as described above with reference to FIG. 3, and how these fields are defined in an intra-BWP search space (de)activation message. However, for the search space index field, since there may be multiple cells (and multiple BWPs) with active search spaces, in some aspects of the present embodiments, the base station may further indicate the corresponding cell (and BWP) of the (de)activated search space in the search space index field of the inter-cell search space (de) activation message. In some aspects of the present embodiments, the base station may apply the SCellindex or cell index, which are provided in the Carrier Aggregation/Dual Connectivity (CA/DC) configuration through RRC signaling, to represent the cell identifier in the index field of the inter-cell search space (de)activation message.

Figure 9A:
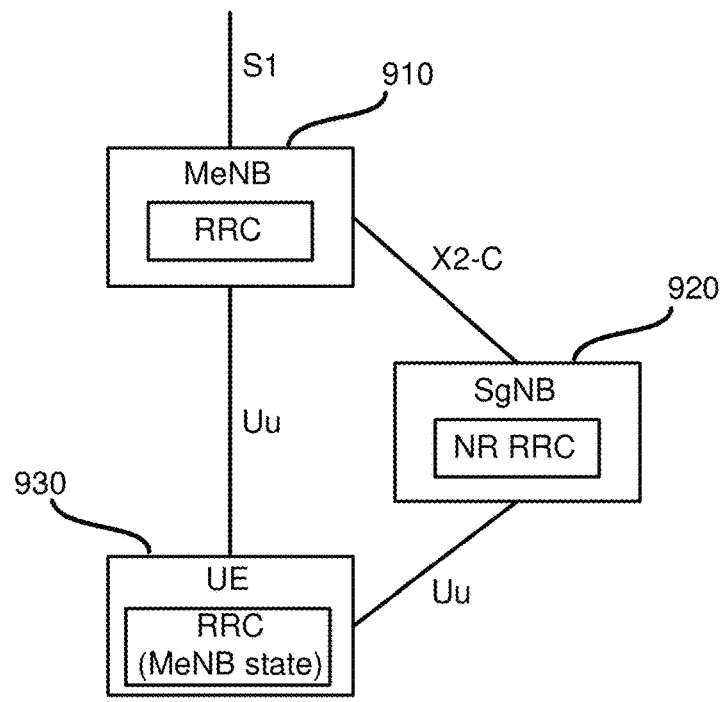
FIG. 9A illustrates activation and deactivation of the search spaces in an LTE-NR Dual-Connectivity (EN-DC) scenario, according to an example implementation of the present application.
Figure 9B:
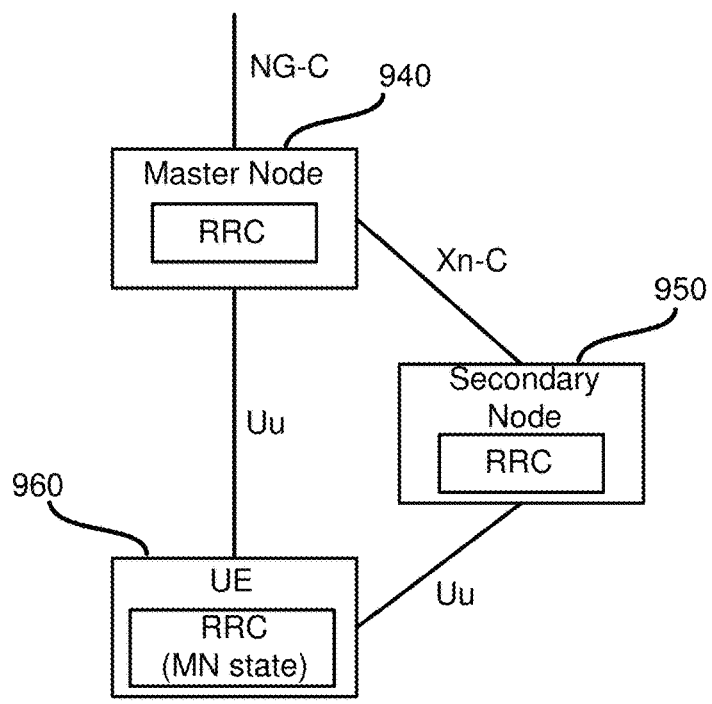
FIG. 9B illustrates activation and deactivation of the search spaces in an NR-DC scenario, according to an example implementation of the present application.

FIGS. 9A and 9B illustrate activation and deactivation of the search spaces in a Multi-RAT Dual Connectivity (MR-DC) scenario, in accordance with various aspects of the present application. Specifically, FIG. 9A illustrates activation and deactivation of the search spaces in an LTE-NR Dual-Connectivity (EN-DC) scenario, in accordance with various aspects of the present application, while FIG. 9B illustrates activation and deactivation of the search spaces in an NR-DC scenario, in accordance with various aspects of the present application.

As shown in FIG. 9A, one LTE eNB 910 is the master eNB (MeNB) to control a master cell group and one NR gNB 920 is the secondary gNB (SgNB) to control a secondary cell group. In the next-generation (e.g., 5G) wireless network, a UE may be configured with multi-connectivity and may connect to a Master Node (MN) as an anchor and one or more Secondary Nodes (SNs) for data delivery. Each node may formulate a cell group that includes one or more cells. For example, an MN may formulate and manage a Master Cell Group (MCG), and an SN may formulate and manage a Secondary Cell Group (SCG). In the illustrated example, the UE 930, in some of the present embodiments, may be configured with DC capability, which may include multiple Radio Access Technologies (e.g., Long Term Evolution, New Radio). For example, UE 930 may be configured with EN-DC, in which MeNB 910 may be in charge of one MCG and SgNB 920 may be in charge of one SCG. Each cell group may include one special cell (e.g., a Primary cell (PCell) in the MCG or a Primary Secondary cell (PSCell) in the SCG) with zero, one, or more than one secondary cells (SCell). Also as shown in FIG. 9A, UE 930 may be configured with one RRC entity to negotiate with the MeNB 910 and SgNB 920. Similarly, each node may also be configured with one RRC entity respectively to realize the control plane in Dual-Connectivity scenario with the UE 930.

In some of the present embodiments, each of the MeNB 910 and the SgNB 920 may deliver the control signaling to the other node through a backhaul connection (e.g., the X2-C interface or Xn interface) to forward the control signaling to one cell group through the relaying of another cell group. For example, in one aspect of the present embodiments, the MeNB 910 may transmit the search space activation/deactivation message for one cell of the MCG to the SgNB 920 through the backhaul connection. In some such embodiments, the SgNB 920 may forward the search space activation/deactivation message to the UE 930 through the cells of the SCG. Alternatively, in some of the present embodiments, the SgNB 920 may also transmit the search space activation/deactivation message for one cell in the SCG to the MeNB 910 through the backhaul connection. The MeNB 910 may then forward the search space activation/deactivation message to the UE 930 through the cells of the MCG.

As shown in FIG. 9B, one NR gNB 940 is the MgNB to control a master cell group and one NR gNB 950 is the SgNB to control a secondary cell group. Similar to the scenario in FIG. 9A, UE 960 may be configured with one RRC entity to negotiate with the MgNB 940 and secondary node 950. Similarly, each node may also be configured with one RRC entity to realize the control plane in Dual-Connectivity scenario with the UE 960. In some of the present embodiments, each of the MgNB 940 and the SgNB 950 may deliver the control signaling to the other node through a backhaul connection (e.g., the Xn-C interface) to forward the control signaling to one cell group through the relaying of another cell group. For example, in one aspect of the present embodiments, the MgNB 940 may transmit the search space activation/deactivation message for one cell of the MCG to the SgNB 950 through the backhaul connection. In some such embodiments, the SgNB 950 may forward the search space activation/deactivation message to the UE 960 through the cells of the SCG. Alternatively, in some of the present embodiments, the SgNB 950 may also transmit the search space activation/deactivation message for one cell in the SCG to the MgNB 940 through the backhaul connection. The MgNB 940 may then forward the search space activation/deactivation message to the UE 960 through the cells of the MCG.

Some aspects of the present embodiments may use the same mechanism as used in an inter-cell search space (de)activation scenario to (de)activate one or more cells in an inter-cell group scenario. For example, a UE may be configured with SCellIndex (e.g., may range from 1 to 30), where the value range and usage of the SCellIndex are applied to cross cell groups (e.g., the SCellIndex 1-15 may be used for a MCG, and SCellIndex 16-30 may be used for a SCG). As such, by further indicating the SCellIndex in the cell indicator (in the (de)activation message), a base station may send an inter-cell group search space (de)activation message by indicating the SCell of another cell group. In addition to a dual connectivity scenario, the same design may be applied to a multiple connectivity scenario (e.g., when more than one SCGs are configured to the UE). However, it should be noted that the SCellIndex may not cover the special cells (e.g., the Primary Cell in the MCG and the Primary Secondary Cell (PSCell) in the SCG(s)). Therefore, as described below, some of the present embodiments may provide an inter-cell group search space (de)activation message for special cells, as described above, in the cell groups (e.g., by replacing the SCellIndex with a ServCellIndex, which is applicable to indicate SpCell(s) and SCell(s) of a UE).

In an inter-Cell Group search space (de)activation scenario, in some of the present embodiments, a UE may have at least two active component carriers (e.g., CC 810 and CC 820, with reference to FIG. 8). In some such embodiments, the first CC (e.g., CC 810) may be configured for one cell (e.g., a PCell) in the MCG, while the other CC (e.g., CC 820) may be configured for another cell (e.g., a PSCell) in the SCG. In some of the present embodiments, there may be another CC (e.g., CC 830), which is configured to another PSCell of another SCG when multiple connectivity scenario is supported by the RAN. In some other aspects of the present embodiments, the UE may be configured with at least one search space in each CC (e.g., SS 870 in CC 810, SS 880 in CC 820, and SS 890 in CC 830, respectively).

Similar to the inter-cell scenario, the inter-cell group search space (de)activation message, in a DCI design, may include a Type field for indicating the type of the search space (de)activation. For example, a value '1' in the type field may indicate an intra-BWP search space (de)activation, a value '2' in the type field may indicate an inter-BWP search space (de)activation, a value '3' in the type field may indicate an inter-cell search space (de)activation, and a value '4' in the type field may indicate an inter-cell group search space (de)activation. Also, Similar to the design in the inter-cell activation message, in some of the present embodiments, the type is delivered to the UE using an implicit approach in DCI signaling. For example, some specific field(s) in the DCI may be set to specific values (e.g. to '0' or '1'). This way, the UE may be able to distinguish the inter-cell search space (de)activation message from other types of DL control signaling. For a MAC CE message delivery design, in some of the present embodiments, the type field may be delivered using an implicit approach. For example, some specific field(s) in the MAC CE may be set to specific values (e.g., '0' or '1') so that the UE may be able to distinguish the inter-cell group search space (de)activation message from other types of MAC CE(s).

The activation status field and the search space index field in an inter-cell group search space (de)activation message, in some of the present embodiments, may be defined the same way, as described above with reference to FIG. 3, and how these fields are defined in an intra-BWP search space (de)activation message. However, for the search space index field, since there may be multiple cells (and multiple BWPs) with active search spaces, in some aspects of the present embodiments, the base station may further indicate the corresponding cell (and BWP) of the (de)activated search space in the search space index field of the inter-cell group search space (de)activation message. In some aspects of the present embodiments, the base station may apply the SCellindex, ServCellIndex, or cell index, which are provided in the Carrier Aggregation/Dual Connectivity (CA/DC) configuration through RRC signaling, to represent the cell identifier in the index field of the inter-cell search space (de)activation message.

Additionally, in a Dual-Connectivity scenario, only the MCG and the SCG may be configured to the UE. As such, for an inter-cell group search space (de)activation message, the gNB may need not to further indicate the cell group in the search space (de)activation message. In contrast, an implicit approach may be applied in some of the present embodiments. For example, the UE may implicitly know one inter-cell group search space (de)activation message is for the search space of a special cell in the SCG when the UE receives the (de)activation message in the cells of the MCG, or vice versa. As such, a cell group indicator may not be needed in a DC scenario in some of the present embodiments. In some such embodiments, however, for a multiple connectivity scenario (e.g., when more than one SCG is configured to the UE), the gNB may need such an additional cell group indicator (in the (de)activation message) to further indicate the (de)activation of search space in another cell group. In some of the present embodiments, 2 bits may be provided in the cell group indicator field. In some such embodiments, different values in the 2-bit indicator may be used to indicate the different cells. For example, a value of '00' may be used to indicate a PCell of the MCG, a value of '01' may be used to indicate a PSCell of a first SCG, and a value of '10' may be used to indicate a PSCell of a second SCG.

In some of the present embodiments, there may be some limitations for the search space deactivation. For example, the default search space (e.g., the common search space for Remaining Minimum System Information (RMSI) decoding, etc.) in each BWP may not be deactivated by a search space deactivation message. In some of the present embodiments, the gNB may deliver the search space (de)activation message only on a special search space (of a BWP in a cell).

For example, the search space (de)activation message may only be delivered on the default search space of the default BWP(s) in one or more special cells (e.g., a PCell in an MCG and a PSCell in an SCG) in some embodiments. Additionally, in one aspect of the present embodiments, the search space deactivation message of one search space may be delivered only on the same search space occasions (e.g., the search space deactivation message of SS #i may only be transmitted on the SS #i occasions). In one aspect of the present embodiments, an SCell may be activated only by a search space activation message (e.g., a gNB may not be able to activate a special cell through search space activation messages).

Some of the present embodiments may modify a search space's configuration using a delta signaling approach. That is, in some of the present embodiments, the information elements in the search space configuration may be set to a particular value, such as 'Need M', in the technical specification. This particular value may indicate to the UE that the information elements the UE receives for the search space configuration initially from the RAN need to be stored and maintained at the UE. In some of the present embodiments, the RAN may then update part of the search space configuration (e.g., the controlResourceSetId, the monitoringSlot-PeriodicityAndOffset, the MonitoringSymbolsWithinSlot, and/or the nrofCandidates, which indicates the CCE aggregation levels, etc.) by transmitting a new search space configuration to the UE (e.g., through a DL control signaling, such as RRC signaling). After the UE receives the new search space configuration, the UE may replace the stored information elements from the latest received information elements. Alternatively, in some of the present embodiments, the UE may keep applying one stored information element when the information element has not been updated (e.g., by the RAN) in the updated search space configuration.

In some of the present embodiments, the RAN may transmit the updated search space configuration message in the same way as discussed above for the search space activation message transmission in the intra-BWP/inter-BWP/inter-Cell/inter-Cell Group scenarios. In addition, the UE may need a preparation time interval for the decoding of the PDCCH candidates based on the updated search space configuration. In some aspects of the present embodiments, a search space update preparation time (e.g., M symbols) may be provided to a UE to apply the updated search space configuration. Therefore, the UE may start decoding the PDCCH candidates based on the updated search space configuration after M symbols when the UE receives the updated search space configuration through the DL control signaling. The base station may also consider the limitation of M symbols when encoding the DCI candidate(s) based on the updated search space (that is just updated by the base station). In some of the present embodiments, the base station may not provide the DCI, based on the updated search space configuration, during the M symbols delay time after transmitting the updated search space configuration to the UE. The value of M, as described above, may be a fixed value (e.g., in the technical specification), or may be a variable depending on the UE's hardware capability. In addition, the value of M may be configured by the base station (e.g., through RRC signaling). Furthermore, in some implementations, the UE may not be expected to receive a $2^{nd}$ search space update message, which reverses the configuration of the previous $1^{st}$ search space update message, for the same search space during the M' symbols (M'≥M) after the UE receives the $1^{st}$ search space activation message for the concerned target search space. The UE may obtain the value of M' based on the approaches also provided above for the acquisition of value of M. In some other embodiments, the UE may implicitly know that the value of M' is the same as the value of M.

Figure 10:
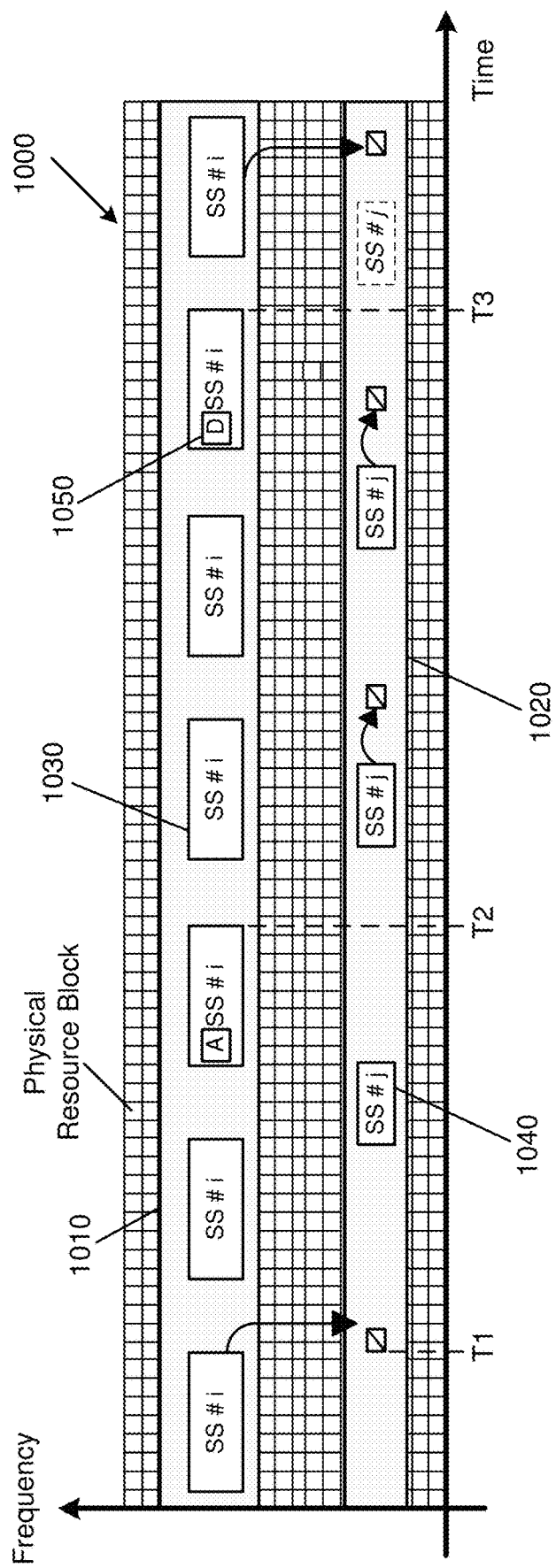
FIG. 10 illustrates a dynamic (de)activation of cross-BWP scheduling on a component carrier in a cross-BWP scheduling scenario, according to an example implementation of the present application.

FIG. 10 illustrates a dynamic (de)activation of cross-BWP scheduling on a component carrier 1000 in a cross-BWP scheduling scenario, in accordance with various aspects of the present application. Specifically, FIG. 10 includes a component carrier (or cell) 1000 including a first BWP 1010 and a second BWP 1020. The BWP 1010 may include the search space SS #i (e.g., SS 1030), while the BWP 1020 may include the search space SS #j (e.g., SS 1040). As shown in FIG. 10, after the SS #j are deactivated (e.g., after receiving the deactivation message 1050 on the BWP 1010), the RAN (e.g., the base station) may provide the UE with information about the BWP 1020 (e.g., the DL scheduling information, the UL grant on BWP 1020, etc.) through DL control signaling using a cross-BWP scheduling mechanism. To achieve cross-BWP scheduling, in some of the present embodiments, the RAN may provide a CrossBWPSchedulingConfig configuration through DL control signaling (e.g., an RRC Reconfiguration message). One example of the CrossBWPSchedulingConfig configuration may be as demonstrated below.

```
CrossBWPSchedulingConfig ::=  SEQUENCE {
    schedulingBWPInfo         CHOICE {
    own                                -- No cross-BWP scheduling
    Cross-BWP                          SEQUENCE { -- Cross-BWP scheduling
        schedulingBWPIndicator                BWP_Indicator,
        }
    }
}
```

In the above configuration, the CrossBWPSchedulingConfig may be set to 'own' if DL control signaling related to the BWP 1020 is provided in the search spaces configured on BWP 1020 itself. On the other hand, the RAN may set the CrossBWPSchedulingConfig to 'Cross-BWP' if the RAN (e.g., the base station) delivers the DL control signaling of on an active BWP, such as BWP 1020, through another target BWP, such as BWP 1010. Additionally, in the above configuration, the RAN may indicate the BWP indicator of the target BWP (e.g., BWP 1010) in the information element 'schedulingBWPIndicator'. In some of the present embodiments, the RAN/UE may implement cross-BWP scheduling after the UE receives the CrossBWPSchedulingConfig. As show in FIG. 10, at time T1 (in time domain), the RAN transmits the DL scheduling information of BWP 1020 in the SS #i occasion of BWP 1010. Then, the SS #j is activated after T2 and so the cross-BWP scheduling mechanism is temporary disabled. However, it is also worthy to note that, in some embodiments, the CrossBWPSchedulingConfig is still stored by the serving RAN and UE respectively. Then, at T3, the UE may deactivate the SS #j after receiving the SS deactivation message 1050 on the BWP 1010 for the deactivation of SS #j and then the cross-BWP scheduling mechanism may be resumed after T3 based on the stored CrossBWPSchedulingConfig.

Also note, in some other implementations, the SS #j may also be deactivated by a MAC CE of a downlink packet configured by a PDCCH candidate in SS #i. Then, the CrossBWPSChedulingConfig configuration in DL control signaling and the cross-BWP scheduling approach are applicable after the UE receiving the search space deactivation message in the MAC CE.

Figure 11:
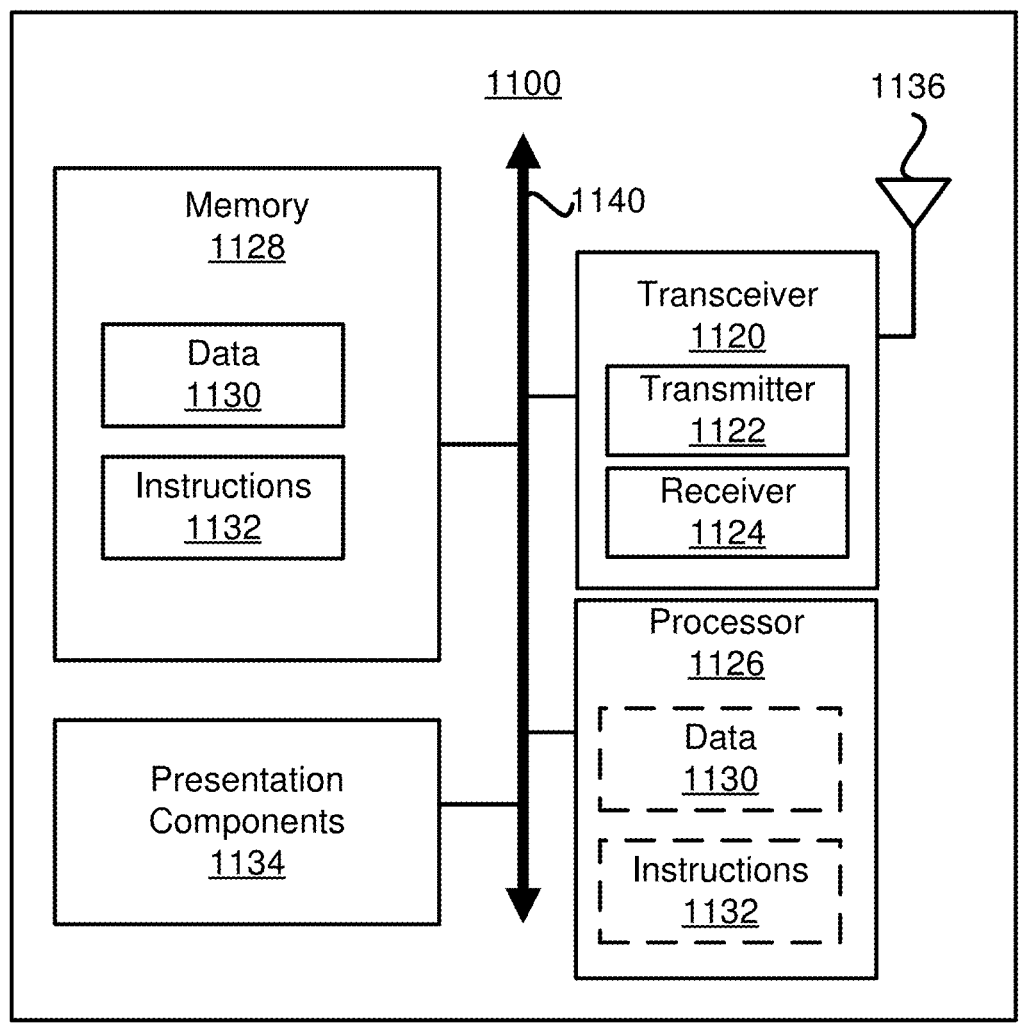
FIG. 11 illustrates a block diagram of a node for wireless communication, in accordance with various aspects of the present application.

FIG. 11 illustrates a block diagram of a node for wireless communication, in accordance with various aspects of the present application. As shown in FIG. 11, node 1100 may include transceiver 1120, processor 1126, memory 1128, one or more presentation components 1134, and at least one antenna 1136. Node 1100 may also include a Radio Frequency (RF) spectrum band module, a base station communications module, a network communications module, and a system communications management module, input/output (I/O) ports, I/O components, and power supply (not explicitly shown in FIG. 11). Each of these components may be in communication with each other, directly or indirectly, over one or more buses 1140.

Transceiver 1120 having transmitter 1122 and receiver 1124 may be configured to transmit and/or receive time and/or frequency resource partitioning information. In some implementations, transceiver 1120 may be configured to transmit in different types of subframes and slots including, but not limited to, usable, non-usable and flexibly usable subframes and slot formats. Transceiver 1120 may be configured to receive data and control signalings.

Node 1100 may include a variety of computer-readable media. Computer-readable media can be any available media that can be accessed by node 1100 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1128 may include computer-storage media in the form of volatile and/or non-volatile memory. Memory 1128 may be removable, non-removable, or a combination thereof. Exemplary memory includes solid-state memory, hard drives, optical-disc drives, and etc. As illustrated in FIG. 11, memory 1128 may store computer-readable, computer-executable instructions 1132 (e.g., software codes) that are configured to, when executed, cause processor 1126 to perform various functions described herein, for example, with reference to FIGS. 1 through 10. Alternatively, instructions 1132 may not be directly executable by processor 1126 but be configured to cause node 1100 (e.g., when compiled and executed) to perform various functions described herein.

Processor 1126 may include an intelligent hardware device, e.g., a central processing unit (CPU), a microcontroller, an ASIC, and etc. Processor 1126 may include memory. Processor 1126 may process data 1130 and instructions 1132 received from memory 1128, and information through transceiver 1120, the base band communications module, and/or the network communications module. Processor 1126 may also process information to be sent to transceiver 1120 for transmission through antenna 1136, to the network communications module for transmission to a core network.

One or more presentation components 1134 presents data indications to a person or other device. For example, one or more presentation components 1134 include a display device, speaker, printing component, vibrating component, etc.

From the above description it is manifest that various techniques can be used for implementing the concepts described in the present application without departing from the scope of those concepts. Moreover, while the concepts have been described with specific reference to certain implementations, a person of ordinary skill in the art may recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method performed by a user equipment (UE) for power saving, the method comprising:
receiving, from a special cell (SpCell), an inter-cell a-bandwidth part (BWP) switching message in Downlink Control Information (DCI), wherein the inter-cell BWP switching message comprises a bitmap each bit of which is associated with a group of secondary cells, and one bit of the bitmap which is associated with a first group of secondary cells indicates to the UE to switch active downlink (DL) BWPs of active secondary cells of the first group of secondary cells;
switching the active DL BWP of each active secondary cell of the first group of secondary cells from a first BWP to a second BWP after receiving the inter-cell BWP switching message, wherein the second BWP is preconfigured to not being associated with any search space; and
monitoring the second DL BWP of each of the active secondary cells in the first group of secondary cells based on a DCI decoding result on a search space configuration of the DCI in the SpCell, the search space configuration including locations of resource blocks in at least one of time domain and frequency domain for monitoring physical downlink control channel (PDCCH) candidates.

2. The method of claim 1, wherein the (SpCell) includes a primary cell (PCell) or a primary secondary cell (PSCell) for the UE.

3. A user equipment (UE), comprising:
one or more non-transitory computer-readable media storing computer-executable instructions; and
at least one processor coupled to the one or more non-transitory computer-readable media, and configured to execute the computer-executable instructions to:
receive, from a special cell (SpCell), an inter-cell bandwidth part (BWP) switching message in Downlink Control Information (DCI), wherein the inter-cell BWP switching message comprises a bitmap each bit of which is associated with a group of secondary cells, and one bit of the bitmap which is associated with a first group of secondary cells indicates to the UE to switch active downlink (DL) BWPs of active secondary cells of the first group of secondary cells;
switch the active DL BWP of each active secondary cell of the first group of secondary cells from a first BWP to a second BWP after receiving the inter-cell BWP switching message, wherein the second BWP is preconfigured to not being associated with any search space; and
monitor the second DL BWP of each of the active secondary cells in the first group of secondary cells based on a DCI decoding result on a search space configuration of the DCI in the SpCell, the search space configuration including locations of resource blocks in at least one of time domain and frequency domain for monitoring physical downlink control channel (PDCCH) candidates.

4. The UE of claim 3, wherein the (SpCell) includes a primary cell (PCell) or a primary secondary cell (PSCell) for the UE.

* * * * *